United States Patent
Crosby et al.

(10) Patent No.: US 11,151,596 B2
(45) Date of Patent: Oct. 19, 2021

(54) SYSTEM AND METHOD FOR SQUADRON COMMUNICATION EXCHANGE BETWEEN RECEIVING DEVICES

(71) Applicant: Squad App, LLC, New Orleans, LA (US)

(72) Inventors: Elizabeth Acomb Crosby, New Orleans, LA (US); Hugh Britton Sanderford, III, New Orleans, LA (US); Adele Humphreys Sanderford, New Orleans, LA (US); Reza Moghtaderi Esfahani, Trinity, NC (US); Charles Thomas Douglas, Jr., Winston-Salem, NC (US); Michael David Newton, Wilmington, DE (US); Hugh Britton Sanderford, Jr., New Orleans, LA (US)

(73) Assignee: Squad App, LLC, New Orleans, LA (US)

( * ) Notice: Subject to any disclaimer, the term of this patent is extended or adjusted under 35 U.S.C. 154(b) by 49 days.

(21) Appl. No.: 16/044,547

(22) Filed: Jul. 25, 2018

(65) Prior Publication Data
US 2019/0034956 A1 Jan. 31, 2019

Related U.S. Application Data

(60) Provisional application No. 62/537,320, filed on Jul. 26, 2017.

(51) Int. Cl.
*G06Q 30/00* (2012.01)
*G06Q 30/02* (2012.01)
*H04W 4/08* (2009.01)
*H04W 4/021* (2018.01)

(52) U.S. Cl.
CPC ..... *G06Q 30/0237* (2013.01); *G06Q 30/0252* (2013.01); *G06Q 30/0261* (2013.01); *H04W 4/021* (2013.01); *H04W 4/08* (2013.01)

(58) Field of Classification Search
None
See application file for complete search history.

(56) References Cited

U.S. PATENT DOCUMENTS

| 7,730,161 | B2 | 6/2010 | Baumann |
| 8,200,770 | B2 | 6/2012 | Ostertag et al. |
| 8,229,819 | B2 | 7/2012 | Ransom et al. |

(Continued)

FOREIGN PATENT DOCUMENTS

WO 2009098505 A1 8/2009

*Primary Examiner* — Meredith A Long
(74) *Attorney, Agent, or Firm* — IP & T Group LLP

(57) ABSTRACT

A method and system for communication protocol pass reduction amongst recipient nodes capable of receiving broadcast messages, the recipient nodes functioning as different decisions points for determination of a passing joint set of nodes for squadron communication therebetween. The method and system provide squadron communication between different ones of the recipient nodes, wherein one of the recipient nodes becomes a squadron leader node upon a selection of a specific broadcast message for distribution to other recipient nodes for acceptance. The squadron leader node and the other recipient nodes upon acceptance form the passing joint set of nodes for squadron communication therebetween.

23 Claims, 13 Drawing Sheets

Geo-Fence examples: GPS, Bluetooth Proximity, WiFi Proximity, Cell Tower ID & SNR, Smartphone Location Service, etc 'Geo-Fence' is in proximity to the Offerer's business: Bar, Restaurant, Movie Theatre, etc A — Offerer Device Computer, P.O.S (point of sale), iPad (OD)

Offer / Deal States:

F — Offering Pending (dormant)
G — Offering Accepted
H — Offering Redeemed
I — Time Expired No Longer Redeemable B — Communications Means C — Coordinating Server (CS)

D — Communications Means

Receipt Device (RD) is a Personal Communications Device (PCD)

...multiplicity...

Portable Display Input Means Communications Means, Location Function (GPS, Bluetooth Proximity, WiFi proximity, Cell Tower ID & SNR, Smart Phone Location Service, etc)

(56) References Cited

U.S. PATENT DOCUMENTS

| | | | |
|---|---|---|---|
| 8,234,193 B2 | 7/2012 | Ransom et al. | |
| 8,973,066 B2 | 3/2015 | Hilson et al. | |
| 9,325,563 B2 | 4/2016 | Kamath et al. | |
| 10,621,609 B2* | 4/2020 | Graham | G06Q 30/0261 |
| 2010/0180232 A1 | 7/2010 | Honan et al. | |
| 2010/0218128 A1 | 8/2010 | Bonat et al. | |
| 2012/0109751 A1 | 5/2012 | Binenstock et al. | |
| 2012/0239505 A1* | 9/2012 | Hu | G06Q 50/01 |
| | | | 705/14.66 |
| 2013/0013389 A1 | 1/2013 | Vitti et al. | |
| 2013/0091001 A1 | 4/2013 | Jia et al. | |
| 2013/0232012 A1 | 9/2013 | Yan et al. | |
| 2014/0006121 A1* | 1/2014 | Barker | G06Q 30/02 |
| | | | 705/14.14 |
| 2014/0108108 A1* | 4/2014 | Artman | G06Q 20/32 |
| | | | 705/14.1 |
| 2014/0164094 A1 | 6/2014 | Bhatia | |
| 2014/0279040 A1 | 9/2014 | Kuboyama | |
| 2015/0025971 A1 | 1/2015 | Shipley et al. | |
| 2015/0106183 A1 | 4/2015 | McEvilly et al. | |
| 2015/0278840 A1 | 10/2015 | Zhao et al. | |
| 2015/0332334 A1 | 11/2015 | Bitran et al. | |
| 2016/0086212 A1* | 3/2016 | Tietzen | G06Q 30/0226 |
| | | | 705/14.27 |
| 2016/0205358 A1* | 7/2016 | Dickinson | H04N 7/181 |
| | | | 348/157 |
| 2017/0178034 A1* | 6/2017 | Skeen | G06F 16/168 |

\* cited by examiner

SYSTEM AND METHOD FOR SQUADRON COMMUNICATION EXCHANGE BETWEEN RECEIVING DEVICES

CROSS-REFERENCES TO RELATED APPLICATIONS

This application is related to and claims priority to provisional U.S. Ser. No. 62/537,320, filed Jul. 26, 2017, titled SYSTEM AND METHOD FOR SQUADRON COMMUNICATION EXCHANGE BETWEEN RECEIVING DEVICES, the entire contents of which are incorporated herein by reference.

BACKGROUND OF THE INVENTION

Field of Invention

The invention relates to a system and computerized method for communication exchange between mobile devices whereby a primary mobile device leverages social networks to provide real time information exchange to other or secondary mobile devices.

Discussion of the Background

Presently, there are known systems for creating and distributing information to groups of people who are both considered likely and/or unlikely to respond to the information received.

U.S. Pat. No. 9,325,563 (the entire contents of which are incorporated herein by reference) describes method for exchanging overlay tunnel information includes receiving an information exchange packet, at a first end point station, from each end point station in a virtual network having a specified virtual network identifier (VNID); and processing each received information exchange packet to retrieve information about connections at each end point station in the virtual network having the specified VNID.

U.S. Pat. No. 8,200,770 (the entire contents of which are incorporated herein by reference) describes mining human capital information by defining one or more attributes of a communication group, extracting a target group by searching one or more of explicit and implicit data sources according to the defined attributes, communicating with the extracted target group, logging at least some of the communications, and analyzing the logged communications U.S. Pat. No. 7,730,161 (the entire contents of which are incorporated herein by reference) describes a system and method for providing on demand information exchange between a data store and a portable recipient data storage device which includes a source of data and a data transfer initiator, coupled to the source of data and configured for initiating the transfer of data from the source of data to a portable recipient data storage device. A data transfer port was provided to couple the data source with the portable recipient data storage device, and configured for transmitting, on request by the recipient, data from the source of data to the portable recipient data storage device.

U.S. Pat. Appl. Publ. No. 2014/0279040 (the entire contents of which are incorporated herein by reference) describes that a restaurant can create a promotional offer for groups comprised of both women and men by offering the women in the group a free food item with the expectation that the drinks purchased by the men in the group would more than offset the loss on the food. The '040 application describes that, if a promotional offer is targeted at and offered to groups with the desired group composition, the probability of its being effective increases as the group composition the promotional offer was structured for is specifically targeted.

U.S. Pat. Appl. Publ. No. 2014/0164094 (the entire contents of which are incorporated herein by reference) describes techniques for facilitating targeted discounts in which a request to distribute a promotional offer is received from a merchant. The promotional offer in the '094 application may be at least partially preconfigured, is maintained at the deal service, and may indicate an item (e.g., a product and/or service) offered by the merchant.

U.S. Pat. Appl. Publ. No. 2015/0332334 (the entire contents of which are incorporated herein by reference) describes a clustering engine configured to identify and create a group of users having a related interest, an offers matching component configured to match a group offer to the group of users, a group services component configured to communicate the group offer to the group of users, and at least one hardware microprocessor configured to execute computer-executable instructions in a memory associated with the clustering engine, the offers matching component, and the group services component.

U.S. Pat. Appl. Publ. No. 2015/0106183 (the entire contents of which are incorporated herein by reference) describes a system and method to provide customized coupons, the method including: receiving, by a user terminal used by a requesting user, radio-frequency (RF) signals containing information usable to determine position, determining a location of the user terminal from the RF signals, determining participating merchants within a configurable distance threshold of the location of the user terminal, retrieving a coupon template from a database, where the coupon template identifies business-related boundaries of an offer from a participating merchant.

SUMMARY OF THE INVENTION

In one embodiment, there is provided a computerized method for communication protocol pass reduction amongst nodes comprising different decisions points to determine a passing joint set of nodes for squadron communication therebetween, where a multiplicity of solution sets is valid. The method comprises providing squadron communication between different recipient nodes, wherein one of the recipient nodes becomes a squadron leader node upon a selection of a specific broadcast message for distribution to other recipient nodes for acceptance; and the squadron leader node and the other recipient nodes upon acceptance form the passing joint set of nodes for squadron communication therebetween.

In one embodiment, there is provided a system to provide directed communication exchange between mobile receiving devices of a squadron including a squadron leader and one or more squadron members. The system has at least a coordinating server in communication with the mobile receiving devices. The coordinating server programmed to: receive a first data stream including a broadcast message, transmit a second data stream including a list of announcements to a first mobile receiving device belonging to a squadron leader, receive a third data stream from the first mobile receiving device including a selected announcement which was selected by the squadron leader on a display of the first mobile receiving device, transmit in a fourth data stream the selected announcement to a second mobile receiving device of a potential member for the squadron; receive a fifth data stream from the second mobile receiving device indicative of the potential member comprising a squadron member, determine that the squadron leader and the one or more squadron members are within a boundary of an enterprise associated with the selected announcement, and transmit in a sixth data stream a verification that the squadron is at the enterprise.

In one embodiment, there is provided a computerized method which receives a first data stream including a broadcast message, transmits a second data stream including a list of announcements to a first mobile receiving device belonging to a squadron leader, receives a third data stream from the first mobile receiving device including a selected announcement which was selected by the squadron leader on a display of the first mobile receiving device, transmits in a fourth data stream the selected announcement to a second mobile receiving device of a potential member for the squadron; receives a fifth data stream from the second mobile receiving device indicative of the potential member comprising a squadron member determines that the squadron leader and the one or more squadron members are within a boundary of an enterprise associated with the selected announcement, and transmits in a sixth data stream a verification that the squadron is at the enterprise.

It is to be understood that both the foregoing general description of the invention and the following detailed description are exemplary, but are not restrictive of the invention.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
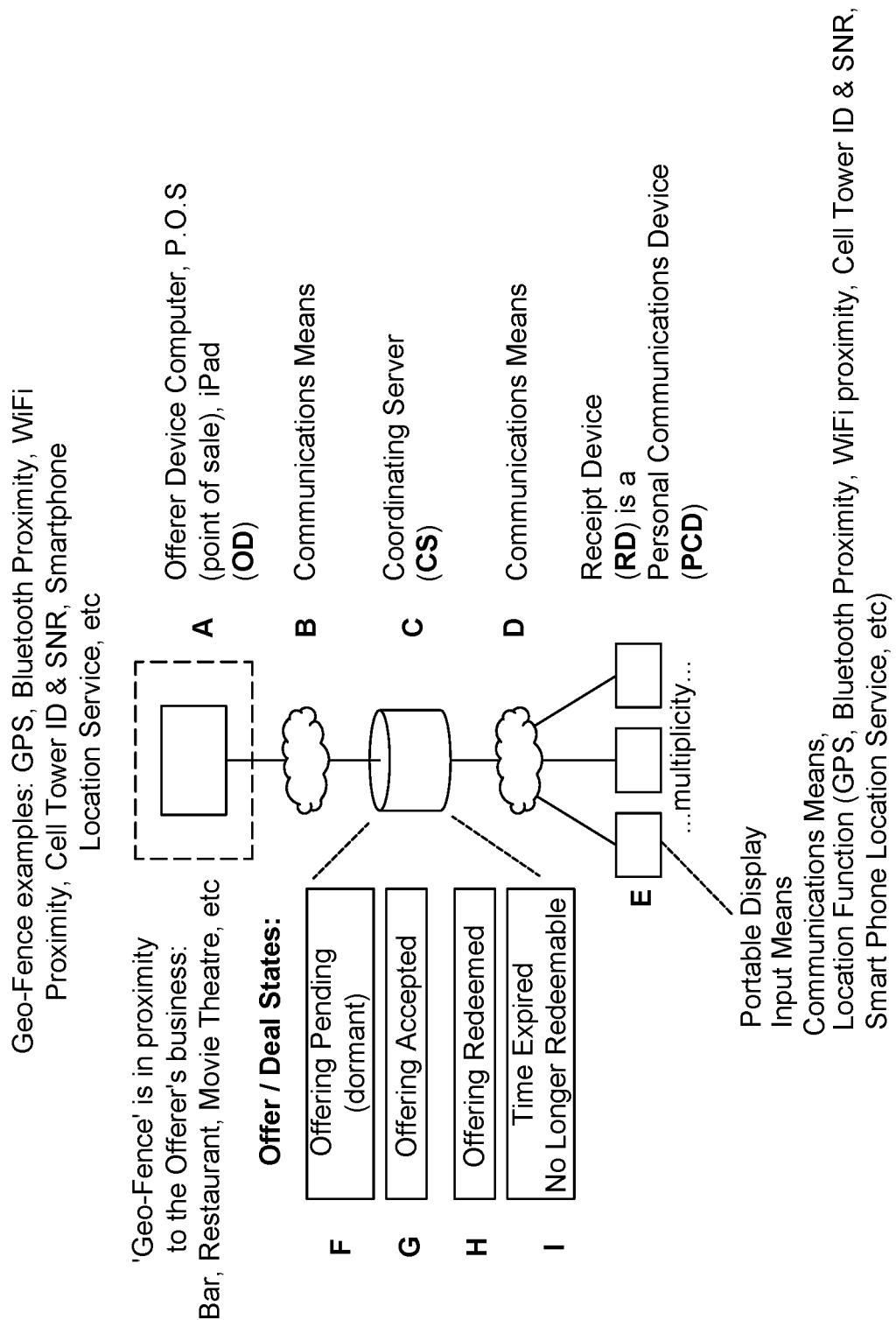
FIG. 1 is a system schematic of a squadron communication system according to the invention.

In the works described above and in other similar information communication systems, steps on the user side and on the enterprise side generating the information for communication were tedious and prone to errors. Moreover, users who typically were already inundated with promotions and other information became desensitized and unwilling to accept any more promotions.

The invention sets forth a system, a computerized method, and a communication exchange program (computer readable medium), hereinafter referred to as the squadron communication exchange program for communication exchange between mobile devices. Squadron communication between different recipient nodes involves one of the recipient nodes becoming a squadron leader node. In one embodiment, the squadron leader node is a receiving device operated by a user. In other embodiments, the squadron leader node is a computerized entity at a node programmed to be in communication with a coordinating server. Upon a selection of a specific broadcast message by the squadron leader node, a broadcast message is distributed to other recipient nodes. In one embodiment of the invention, the squadron leader node and the other recipient nodes upon acceptance (for example acceptance of an incentive), or upon acceptance into a cooperative, form a passing joint set of nodes for squadron communication therebetween.

In one embodiment, the communication exchange involves the communication of couponing of vendor offered deals/discounts to the secondary mobile devices. In another embodiment, the information exchange is directed to job-related data exchanged with secondary mobile devices associated with an industrial project and the server is a work-place server. In another embodiment, the information exchange is directed to job-related data exchanged with secondary mobile devices on job sites and the server is a work-place server. In another embodiment, the information exchange is directed to weather-related data exchange with secondary mobile devices within a proximity of the primary device and the server is a radar server. In another embodiment, the information exchange is directed to weather-related data exchange with secondary mobile devices within a proximity of a national park. In another embodiment, the information exchange is directed to sports-related data exchange with secondary mobile devices within a proximity of the primary device (for example inside a football arena, a soccer field, a basketball arena, a race car sport complex, etc., and the server is a sport-broadcasting server.

In another embodiment, the information exchange is directed to exchanges of communication concerning businesses attempting to load-level its affairs by announcing deals to entice customers as a group to come to the place of business within prescribed time periods and at a prescribed number to redeem the deals. In another embodiment, the information exchange is directed to exchanges of communication concerning businesses attempting to load-level its affairs by announcing offers to entice service providers as a group to come to the place of business within prescribed time periods and at a prescribed number to accept the offers. In another embodiment, the information exchange is directed to the exchange of information between transportation providers incentivizing the transportation providers to utilize a transportation route which is being presently or which has historically been underutilized.

Accordingly, in another embodiment of the invention, the squadron leader can be a computerized entity at a physical node of a distributed set of nodes, such as for example substations in an electric utility grid or pumping stations in a pipeline grid. The squadron leader in this example is in communication via a coordinating server with other substations (or pumping nodes) and aware of local conditions which can affect the distribution of product. A utility provider can be an enterprise broadcasting announcements or communications across the distribution network related to power alerts, power reductions, and/or incentives to reduce power consumption.

For example, 10 kV transformers are typical at substations and have a maximum load before overloading and potential explosions. Before electric vehicles, the load of a house was consistent and the load of 4-6 houses could be shared on one 10 kv transformer With the advent of electric vehicles, an electric vehicle when being charged can offer an additional load equivalent to the entire home. A 10 kV transformer can withstand one such added load but it's not designed for 5 added loads the equivalent of 10 homes on one transformer. Since homes have their max loads during the day, at night there is reduced load and therefore spare capacity. Hence, the utility can incentivize electric car owners by discounting cost of per KWH.

In one embodiment of the invention, the substation entity can act as a squad leader and offer to the 4-6 homes sharing a transformer a slot of time at night to charge at a discounted rate, where the discounted rate is a deal provided by the utility company. The households (or their cars) are invited to join the squad. The electric meter or electronics in the car, can accept the time slot, and the substation can alert the utility that the load will be presented in those times slots. The utility can require a minimum number of households or cars within the substation's service area to accept the time slots before authorizing the discount.

Accordingly, in one embodiment of the invention, a squadron leader operating a primary mobile device (downloaded with or pre-programmed at the factory with the above-noted squadron communication exchange program) can leverage for example the power of social networking to encourage a group of friends (utilizing for example the secondary mobile devices) to take a deal/discount from a vendor that the squadron leader has knowledge of. The user of the primary mobile device can add his/her comments to the exchanged information so the user of the secondary mobile devices can access both the deal/discounts along with the squadron leader's comments. Meanwhile, a vendor utilizing the system of the invention through at least the internet is able to verify by the use of location services on the primary mobile device and the secondary mobile devices that a group (a squadron) including the users of the primary mobile device and the secondary mobile devices have arrived at a point of purchase (POP) at a preselected time.

Figure 12:
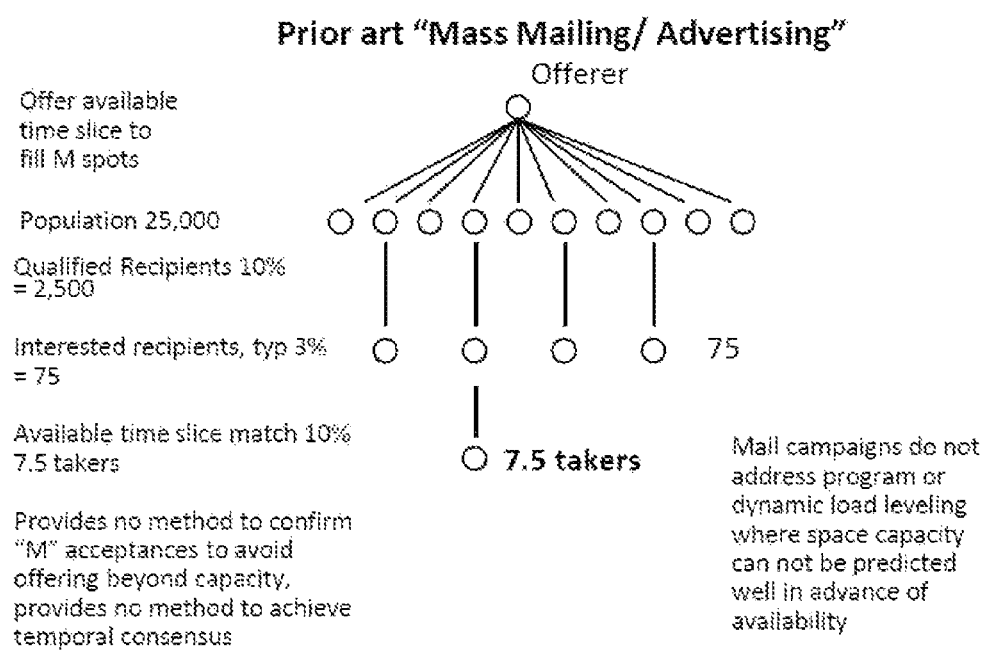
FIG. 12 is a schematic depiction of a prior art mass mailing diagram.

While not limited to the discussion below, the discussion below illustrates the capability of social networking (or the distribution of knowledge known to a particular node to other recipients) to enhance the effectiveness of the squadron communication. Take for example the world of mass mailing and advertisement shown in FIG. 12.

Figure 13:
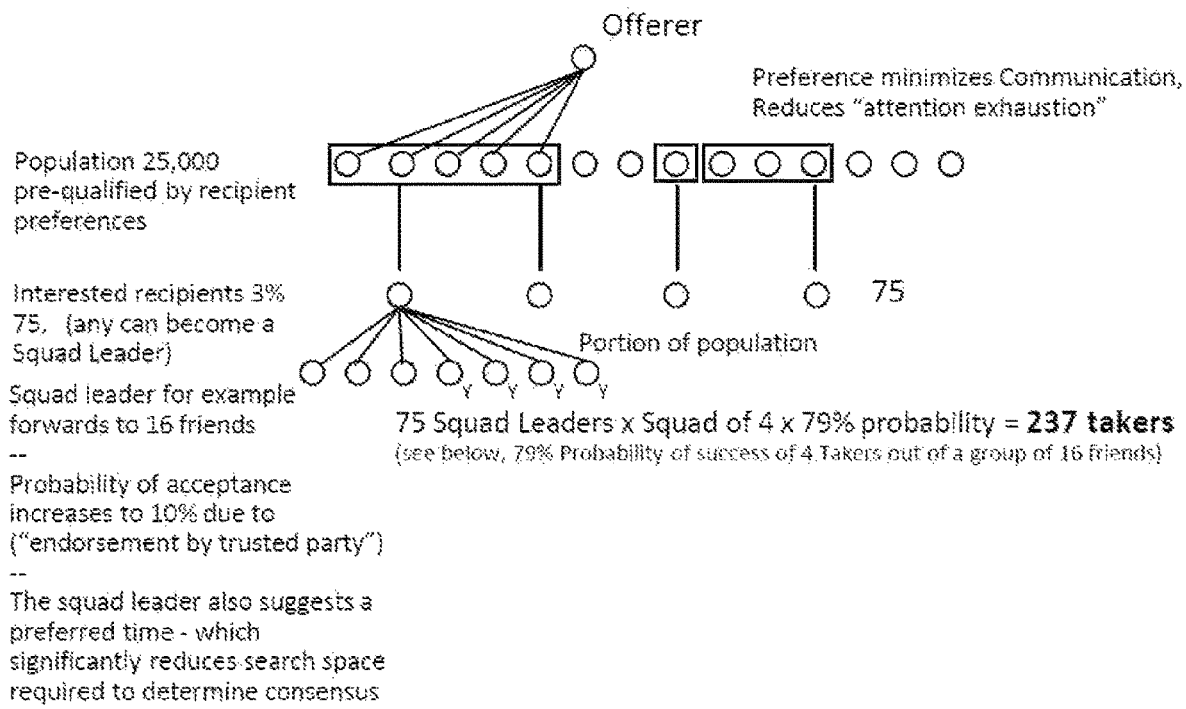
FIG. 13 is a schematic depiction of target success rate of one embodiment of the present invention.

Thus, the "expected" target success rate of reaching a recipient who intends to take the offer is only 7.5/25000 or 0.03%. Meanwhile, the expected target success rate is substantially higher in the squadron communication of the invention as shown in FIG. 13 which starts with the same population of 25,000 people.

Thus, the "expected" target success rate of reaching a recipient who intends to take the offer using squadron communication is only 237/25000 or 0.95%.

In another embodiment of the invention, the squadron leader operating a receiving device (downloaded with or pre-programmed at the factory with the above-noted communication exchange program) can act as above except that, in this internet shopping example, the social networking effect encourages the squadron members to accept the deal of the leader (for example based on the leader's knowledge of a company's products), and the deal is redeemed only when each of the squadron members have supplied credit card information to the enterprise sponsoring the deal.

In another embodiment of the invention, the squadron leader operating the primary mobile device (downloaded with or pre-programmed at the factory with the above-noted communication exchange program) can have distributed for example the latest set of approved building plans from his company's server to a group of co-workers (utilizing the secondary mobile devices) in the time frame and order that the SQUADRON leader considers best. The squadron leader can supply comments to the building plans which he/she consider appropriate for completing the job. Meanwhile, the company's server can verify the distribution of the plans to the job-site workers utilizing the system's location services to verify that the secondary mobile devices have received the building plans and replied.

In another embodiment of the invention, the squadron leader operating the primary mobile device (downloaded with or pre-programmed at the factory with the above-noted squadron communication exchange Internet program) can have distributed for example sports related information to a group of friends or associates (utilizing the secondary mobile devices) permitting the squadron leader and others to know the latest on for example injury reports or the results of other games. Sporting events including especially automobile racing events as well as many job-sites have such high background noise levels that the communication and sharing of news or other information is difficult audibly.

In another embodiment of the invention, the squadron leader operating the primary mobile device (downloaded with or pre-programmed at the factory with the above-noted squadron communication exchange Internet program) can have distributed for example weather related information to a group of associates or friends (utilizing the secondary mobile devices) alerts on changing weather conditions with the squadron leader providing comments such as specific directions which should be undertaken by one or all of the secondary user devices.

From a technological point of view, the squadron process of the invention enhances the probability of an announcement (e.g., of a promotion, deal, news event, alert, etc,) reaches a targeted audience that is likely to respond to the announcement. In today's world, traditional approaches to distribute information depend on a generic broadcast of the information across the internet with a low probability that it reaches a targeted audience and an even lower probability that the targeted audience will respond. The squadron leader represents a paradigm shift in targeted communication. The squadron leader sits at the hub of the decision tree process directing selected announcements to those that the squadron leader views as likely to respond favorably for example because of a known common interest. The recipients of the selected announcements (selected by the squadron leader) are far more likely to respond favorably to the selected announcements than an average person receiving the same announcement because of for example the common interest or purely because of the perceived recommendation (or in some cases command) of the squadron leader. For these reasons, the technological steps required to secure bona fide recipients who respond to the announcements are reduced, and the efficiency of announcement (or communication exchange) is increased over present web based distribution systems.

Real Time Operation

A user signs up for the squadron communication exchange program by downloading the program and entering in his/her cell phone number or otherwise providing some other unique identifier such as a username (and password) from another web program. The web server supporting the squadron communication exchange program will create an account for the user and allow the user of the master or primary mobile device to invite and connect with others such as friends, family, coworkers, associates, or subordinates. The invitations can be generated form a contact list of the user's phone and sent out. In general, the invitations can be sent to anyone selected by the SQUADRON leader who has a working cell phone number.

The squadron communication exchange program in one embodiment of the invention can function as a social media application which hosts a list of deals provided by businesses participating in this Internet communication service. Such businesses may include restaurants and bars, sporting complexes, construction companies, national parks, national and local radar providers, national and local news providers, etc.

In one embodiment of the invention, the squadron communication exchange program provides the master or primary mobile device the capability for logged-in user to display thereon a deal page, which serves as a home page for the mobile device installed application. The primary mobile device upon a user login (or within a programmed time delay) connects to the coordinating server having stored thereon information regarding businesses or enterprises sponsoring promotion(s) or otherwise broadcasting announcements. These announcements can be "active" deals that are ready to be redeemed by businesses such as restaurants and bars. These announcements can be weather or news alerts. These announcements can be information on parking or exiting a sporting complex. These announcements can be construction orders or changes in construction orders.

In one embodiment of the invention, the squadron communication exchange program provides the master or primary mobile device the capability to filter the announcements to where only announcements are posted on the deal or home page of the master or primary mobile device which come from businesses with a given proximity to the master or primary mobile device. For example, the user of the master or primary mobile device in the context of business couponing will initially be shown on the deal page announcements for coupons from businesses having deals that are the closest to the primary mobile device. The installed program permits a user to filter deals by many other methods such as size, price, category of the establishment, type of cuisine or bar. The installed program can permit a user of the master or primary mobile device to filter deals that are popular or about to expire. The installed program can permit a user of the master or primary mobile device to identify favorites among those businesses participating. This will give those businesses priority on the master or primary mobile device's home or deal Page, as well as send the user a notification whenever that business establishment has a deal that goes live (providing the user has agreed to accept notifications). A push notification can be used. A push notification is the delivery of information from a software application to a computing device without a specific request from the user.

In another example, the user of the master or primary mobile device in the context of attending a sporting event will initially be shown on the home page announcements for events ongoing at the sporting complex. Since it is common for one sporting complex to located close to another sporting complex, the closest complex represents the event being attended. Announcements about that sporting complex or the teams playing in the attended event will provided to the home or deal page of the master or primary mobile device. The installed squadron program can permit a user of the master or primary mobile device to filter announcements to only those in the sporting complex attended, or to only those in the neighboring complex. For instance, while watching a fall-time football game, the user of master or primary mobile device may want to know details of a baseball game being played at the same time across town, across the country, or nearby. The installed squadron program can permit a user of the master or primary mobile device to filter and provide only those pertinent to one game or another to friends or colleagues who have been selected by the user of the master mobile device.

In the sporting complex example above, an initiating user of the squadron communication exchange program may find the ESPN has a web page posting statistics of the players during the game. The user activates the squadron communication exchange program on his/her mobile device. Once activated, the user invites friends who are at the game or away from the game to join in the squadron session. Those of the invitees that accept and join in the squadron session are sent information which the initiating user selected from the ESPN web page. By having the data/information from the ESPN web page in a user-selectable format, the initiating user can readily select and send specific contents of the ESPN web page to the others joining the squadron session.

In one embodiment of the invention, the squadron communication exchange program counts the amount of information shared with the users from the ESPN web page. The ESPN web page provider may stipulate that use of their web page data comes with a condition that one or more of the associated advertisements are provided to the squad. In this way, the ESPN web page provider benefits from a large number for the squadron size.

In another example, the user of the master or primary mobile device in the context of a building construction will initially be shown on the home page announcements for changes to plans on the fifth floor of a building renovation. Announcements can be provided to the home or deal page of the master mobile device for the fifth floor, and later displayed for a different floor when the user of the master mobile device travels to another floor. The installed squadron program can permit a user of the master or primary mobile device to filter and provide only those pertinent to the fifth floor to workers on the fifth floor.

In one embodiment of the invention, the communication exchange program downloads from the business server deals, promotions, locations of the deals or promotions, phone numbers for contact and verification, and other pertinent information such as the above-noted news, sports, and weather information. A user of the master mobile device seeing an announcement of a deal on the home or deal page of the master mobile device can choose to share the deal with their friends or coworkers or associates. The deal may offer a discount, special item, free item, or any other means of advertising that would entice a person to visit their establishment. The deals may require a certain number of people to visit the business at its physical location for a deal to be redeemed, this number referred to hereinafter as the squadron size. The squadron size can range from two users to over ten. The squadron size for redemption of the offer is up to the establishment providing the deal.

When a user initiates the squadron communication exchange program on their mobile device, upon opening the application or performing any action that requires data or communication to a server, in one embodiment of the invention, the squadron communication exchange program issues a request to the squadron coordinating server (e.g., a backend in Amazon Web Services). For example, for the deals page showing the available deals to the user on their mobile receiving device, the user selects certain filters on his/her mobile device and those selections are sent to the coordinating server. Deals are returned that match those filters and other criteria the coordinating server has stored. The user can the select one of those deals and go through the squad creation/redemption process (which is elaborated on below). In the coordinating server, the deals are stored in the database and associated with their respective businesses. Squads are associated with their respective deals.

Then, the squadron communication exchange program executes in one embodiment an algorithm which runs on the backend infrastructures. An example of the backend infrastructure could be Amazon Web Services EC2 instance or Lambda function. This is a typical computer server capable of executing code in a programming language such as Java or Node.Js Backend infrastructure means servers that are either self-hosted or hosted by third parties. Common third parties are Amazon Web Services, Google Cloud Platform, etc. The executed algorithm returns deal(s) to the initiating user's mobile phone. The initiating user on his/her mobile device selects a deal and then selects other potential squadron users from their contacts and creates the squadron group. Afterwards, in one embodiment of the invention. each invited user must accept to be a part of the squadron. The squadron coordinating server validates the data and confirms the squadron users. The squadron communication exchange program programs the mobile devices to be in communication with the SQUADRON coordinating server. Once all squadron users are within a certain radius (proximity) of the location of the business sponsoring the deal/promotion, then the initiating user's mobile phone or the squadron coordinating server validates that all users are there, and then the initiating user is allowed to redeem the deal.

Accordingly, the initiating user after activation of the squadron communication exchange program on his/her mobile device, invites others to join in a squadron session where those invitees will be able to see information about the deals/promotions. Those of the invitees that accept and join in the squadron session are sent information which the initiating user selected from the business's web server.

Accordingly, the user of the primary or master mobile device (i.e., the squadron leader) is able with the squadron communication exchange program to invite contacts (e.g., from their friends or contacts list). The squadron communication exchange program sends message in a predetermined format to the contacts permitting the contacts to respond by accepting (on their mobile devices) and downloading the squadron communication exchange program if it is not already installed. The squadron communication exchange program provides the implementation for the protocol for communication between the user and the coordinating server. Those people contacted can, by using their mobile devices as the secondary mobile devices, accept the invitation or decline it.

Once the required number of members have accepted the invitation, the promotion is considered full, and the master or primary mobile device will re-establish communication with the coordinating server. The coordinating server can confirm acceptance of the promotion and/or that the user and the confirmed contacts (hereinafter referred to as "the squadron") will visit the business establishment to redeem the accompanying deal. For example:

Pizza place has half off pizza for SQUADRON of 4. SQUADRON leader invites three friends and they all accept. This SQUADRON is ready to visit the Pizza restaurant.

In one embodiment of the invention, members of the squadron visit the business establishment offering the promotion in order to be able to redeem the promotion. Once all of the squadron members arrive at the establishment, the members open the squadron application on their mobile devices to "check-in" to the location. The squadron communication exchange program uses location services, and checks which members of the squadron are at the location. The squadron communication exchange program then permits communication from the coordinating server to the business server to receive confirmation that the required squadron size is present and that the promotion is redeemable. The squadron communication exchange program can have the coordinating server supply one or more of a phone number, a link to the businesses website, and/or a Google Maps address to the users to assist in finding the location of the business sponsoring the promotion. In one embodiment of the invention, once everyone in the squadron has checked in, the deal offer will go from its dormant stage to its ready to redeem stage.

In one embodiment of the invention, the squadron communication exchange program sets a redeem button on the home page. Then, the squadron leader can hit the redeem button and show the promotion/deal to whoever is serving the squadron at the establishment, thereby redeeming the deal. In one embodiment of the invention, the squadron communication exchange program provides a countdown timer will follow the push of the redeem button, so that a squadron cannot try to redeem the same deal multiple times.

While the processing at the mobile devices uses communication with a business server or a squadron coordinating server, in a preferred embodiment, the computing/processing of the offer selections, recipient invitations, recipient acceptance, deal redemption, proximity of users to business, and counting of those in the squadron is performed by servers outside of the business or outside that of a single entity operating the squadron mobile application.

In other embodiments of the invention, outside of the mobile devices, an offeror enters information describing an offer or a promotion in a database accessible to the users of the squadron communication exchange program or the squadron coordinating server (CS). Outside of the mobile devices, a coordinator using for example the squadron coordinating server can review and approve or reject the proposed offer. Outside of the mobile devices, the CS routes offer(s) to identified recipients based on and sorted by their preferences. The Recipient using their receiving device (RD) e.g., their mobile phone serving a personal computing device (PCD) can choose offering from a multiplicity of offers. The Recipient using the input means of the PCD to optionally accept the offering and promote it to other squadron members who are in the Recipient's contact list. The squadron coordinating server or a device at the point of sale can collect proximity information from RDs (or the RDs may communicate with one another) and calculates their distance to the business offering the promotion.

If proximity information indicates that the minimum number of recipients required to make an offer bona fide are in proximity to the offeror within a certain time period and have all accepted the offer, then the CS enables the redemption of the offer by the recipient(s). Recipient (by way of the PCD and/or the CS) is provided with code/redemption instruction/bar code or RF communication to offeror, and recipient receives incentive/discount of offering.

SQUADRON Implementation Attributes

1) Offeror (e.g. Offeror's business: bar, restaurant, movie, etc.) enters info into an offer database (OD) describing the offering:
Description of offering (e.g. hamburger)
Economics of offering (e.g. ½ off regular price)
Location of offering vendor code
(street address, latitude/longitude or any method suitable for use with PCD "location services"
Time and date of offering
Minimum number of recipients accepting offer for a "bona fide" offer that is redeemable.

2) The contents/offers are transferred from the offeror's device to the squadron coordinating server using communication means such as the internet 3) The squadron coordinating server routes offers to identified recipients, for example those who have shown preference and who are geographically local to the business or promotional offeror (e.g. using communication means to push the offer to an identified multiplicity of recipient devices). The squadron application measures proximity to validate redemption of the offer. More specifically, the SQUADRON application can measure the proximity relative to the point of purchase to validate redemption. While arbitrary, in one example, the proximity criteria is set at approximately 150 meters. The squadron coordinating server or a device at the point of sale can be used to collect proximity information from RD's (or the RD's may communication with one another) by using at least one of (GPS, WiFi, BLUETOOTH™, cell tower information, or smart phone location services). If the proximity information indicates that a minimum number of recipients required to make an offer bona fide are in proximity to offeror, then the squadron CS enables the redemption of the offer by the recipients. The corresponding user mobile or receiving devices (e.g., the mobile device of the squadron leader) can display a code or a time counter. In one embodiment of the invention, "accepted" means all members have agreed to be a part of a squad; "checked in" means that a user has accepted a squad invite, has arrived at the location within the specified time, and (in the case our specific implementation) pressed a button which triggers the location check which confirmed they were within some defined proximity of the business; and "redeemed" means that all users are within the defined proximity and the squad leader has (in the case of our specific implementation) pressed a button which "redeems" the deal which then displays the timer/code. Additionally or alternatively, the squadron CS can communicate this information electronically to the offeror. Optionally, the proximity information is collected every time that the RD is activated.

4) The squadron user's mobile or receiving device optionally displaying the offer and making a tone alert if offeror is on recipient's preferred list (e.g. "Favorite"). Specifically, a push notification can be sent if a business posts a deal and the user has favorited that business, and the user has left notifications enable for that business and the businesses have notification enabled.

5) The squadron user is able to use their mobile or receiving device to "shop" for offerings from a multiplicity of offers based on a set of filters such as price tier, distance, food type, squadron size etc.

6) The squadron user can optionally accept the offering and select other recipients to be notified of recipient's acceptance, and preferred time and date to receive offering; where another recipient list includes one or more names, phone numbers, user IDs, in a pre-compiled list of preferred recipients (eg "Friends list", there can be more than one group of friends identified by Recipient in Recipient RD). The recipient's acceptance and other details are transferred by communication means to the squadron CS, the CS transfers the acceptance and other details to a multiplicity of mobile or receiving devices associated with the preferred recipient list.

7) Optionally, the first recipient to accept a deal becomes the "squadron leader" who then promotes the deal with their contact list of friends. The squadron leader can send a custom message (e.g. "Lets meet at Joe's at 7:30 PM Tuesday") even outside of the squadron application.

8) Optionally, the squadron leader and/or other recipients receives "points" that can be used to redeem prizes.

9) When the minimum number of recipients accepts offer, the offer goes into "pending" state, and optionally the CS may send this information to the OD to notify offeror of potential demand (take rate).

9) CS provides code/redemption instruction/bar code or RF communication from offeror to the squadron user. The CS can provide to the squadron users incentive/discount offerings. The discount code may be compatible with existing Point Of Sales/Point of Purchase terminals.

10) With the squadron application, the offer is originally created by the business/offeror and not by the mobile user. squadron users can get a push notification when their favorite business posts a deal. Deals may also be "pushed" to the user based on their preferences.

11) In one embodiment of the invention, with the squadron application, the coordinating server initially routes offers to the recipients. The recipients may get every offer available in the system sorted by distance from their location. The offers provided to the recipient could also be based on expiration date, pricing tier, etc. In general, filtering can help eliminate an incompatible result from the CS, while sorting will simply put the less favorable results at the bottom of the list and bring the ones with highest match to the top Regardless, the recipients can choose to limit those offers by a variety of filters such as pricing tier, date, squadron size, food category, etc. and the server will then only re-send offers that match their criteria.

12) In one embodiment of the invention, with the squadron application, no single user can accept the offer on behalf of the group without the prior acceptance of each member of the group. In this embodiment, the squadron application does not allow a single member of group to accept on behalf of the group. Indeed, one purpose of the squadron application is to leverage the social media aspect of networking: any member of the group can promote an offer to other members of the group, those members act independently to accept the offer which increases their commitment and chance of the recipients showing up to receive the offer/

13) In one embodiment of the invention, accepting an offer simply means electing to promote/distribute it to others in order to build a squad.

14) In one embodiment of the invention, with the squadron application, a merchant version of the application would allow for "soft-copy" deal redemption via scanning or other notification methods. In this embodiment, a merchant would have a device to scan a code shown on the customer's device. The offer will then have verified the presence of the customer in the merchant's facility. In this embodiment, other information used for payment could be supplied through the squadron backend services;

15) In one embodiment of the invention, with the squadron application, the squadron application performs the step of determining if the terms of a promotion have been met.

16) The CS may optionally provide to the offeror actuarial data such at duration of recipients stay in proximity to the offeror, or demographic such as recipients age, sex, marital status or employment status.

17) In one option, a business can set a start time and end time for redemption. In other words, the deal can only be used within a designated time (e.g., a short time of 1 to 2 days) after being redeemed.

18) In one option, a business can override a squad's number requirement if one of the squadron members fails to show up. In this embodiment, the business will be provided with a code, known only to the business sponsoring the deal/promotion, which allows the deal to be changed from the dormant stage to the active stage, without every member of the squadron having to check into the location.

19) In one option, a newsfeed page known as a "squadron Buzz" page allows users to see what deals their friends are redeeming and other news that the squadron coordinating server may find interesting to share.

20) In one option, the users of the Squadron application and the participating businesses both receive a point based reward for every deal redeemed. A business can use these points to earn themselves free hours of time on the squadron coordinating server.

Generalized Squadron Communication

In one embodiment, the squadron communication exchange program programs a master or primary mobile device or a coordinating server to:

1) receive communication information at a coordinating server;

2) format the communication information received in a format for user selection on the master or primary mobile device;

3) store selected information selected by the user of the master or primary mobile device;

4) identify secondary recipients for sharing the selected information with;

5) optionally, invite the secondary recipients to accept communication regarding the selected information; and 6) provide at least one of the secondary recipients the selected information for their acceptance.

Accordingly, in one embodiment of the invention, there is provided a method of efficient communication exchange to electronically verify consensus on a proximally and temporally constrained solution space. The system implementing the method includes a multiplicity of mobile devices programmed with a communication exchange program to receive communication information from a coordinating server, and a master mobile device programmed to (within an execution of the communication exchange program): display the information received from the coordinating server in a format for user selection on the master mobile device, identify user selection of selected information from the communication information, store the selected information, and identify secondary recipients for sharing the selected information with. The coordinating server sends the secondary recipients an invitation to accept communication regarding the selected information. The system further comprises at least one secondary mobile device associated with one of the secondary recipients and configured to receive a part or all of the selected information. Consensus confirmation is accomplished in one example when the master and the secondarily invited mobile devices become physically present within a specific distance from a geographic location set by the coordinating server. Consensus confirmation is accomplished in another example when the coordinating server recognizes that the master mobile device and a predetermined number (greater than or equal to 1) of the secondarily invited mobile devices respond positively to the selected information.

In a more generalized embodiment of the invention, there is provided a method and system for communication protocol pass reduction amongst nodes (different decisions points), to discover a passing joint set of nodes, where a multiplicity of sets solutions are valid. The method and system in this embodiment, provide communication between different announcement or offer-providing nodes and different recipient nodes. One of the recipient nodes becomes a leader node upon selecting one of the announcement or offers (that is selecting one "offer node" amongst the different announcement or offer-providing nodes) for distribution to other nodes (other recipients). The distribution of the other nodes constitutes a specific referral node. The group of nodes that accept participation with respect to the leader-selected offer node define a joint nodal set amongst a multiplicity of solution sets which would be valid. The node tree includes:

a. MANY OFFER NODES
b. MANY Recipient NODES
c. ONE Recipient becomes the Leader node
d. One OFFER NODE is selected
e. MANY Referral Nodes Accordingly, the invention provides for an efficient way to distribute and provide information to a set of nodes with a higher probability that favorable decisions points will be reached than without the establishment of a node leader.

System Implementation

Detailed below are systems and algorithms used by the squadron system to implement the various actions and functions noted above. These algorithms can be stored and executed in one of more of the special purpose computing devices discussed below in relation to FIG. 11.

In the system schematic of FIG. 1, at A, the offeror device is a computer or processor associated with the business (located at the business or enterprise or located elsewhere). For example, the offeror device could be a business's server, or a computer at a point of sale (POS), or an offeror's personal device e.g., an iPad (OD). At B, communication means operate using internet protocols for data communication from one device to another. At C, the coordinating server (CS) can be the overall squadron backend services running on a third-party provider such as for example Amazon Web Services (AWS). Backend services are those services not performed on the squadron user's mobile or receiving devices. At D, communication means once again operate using internet protocols for data communication from one device to another.

At E, a multiplicity of recipient devices (RD) which are personal communications devices (PCD) that include a portable display, input means, communication means, location functions such as GPS, Bluetooth Proximity, WiFi proximity, Cell Tower ID & SNR, Smartphone location services, etc. As shown in FIG. 1, in the coordinating server (CS) are stored and tagged (F) Offer State 1: offer pending—This means the offer is available on the squadron app and can be promoted by any user to their contacts. In one embodiment of the invention, the offers/deals which are pending are not necessarily related to the deals being actually redeemed at for example the point of sale. The pending offer states here are: in-review, approved, and rejected, and are solely for the purpose of deciding whether a deal a business submitted should be allowed on the application or not.

(G) Offer State 2: Offer Accepted—This means that all members of a squadron have accepted to participate in an offer.

(H) Offer State 3: Offering Redeemed—This means that all members of the squadron have physically appeared at the Merchant/Offeror location and that the Squadron Leader has pressed the redeem button on their PCD. This will start a timer that one of the squadron members shows to the offeror staff to verify and complete the redemption.

(I) Offer State 4: Time Expired—This means that the offer time has lapsed and no SQUADRON member is allowed to promote it to their contacts. Once an offer is expired it will not be able to be redeemed anymore.

Two other states can be utilized: a rejected state and a checked in state.

The rejected state is when a squad member or leader rejects a deal invite. This state could result in the whole squad being rejected, yet allowing any of the squadron members to re-create a squad with this deal. This state could result in the case that if one or more members rejects, the rejected members can be replaced with other people.

The checked in state means that, in one embodiment, a squad member has arrived at the location of the deal that has been accepted and explicitly checked in. In this embodiment, all squad members except for the leader must have explicitly checked in before the leader can redeem a deal. In one embodiment, the checking in could be done with the user simply opening the application on their phone or scanning a QR code or tapping their phone to an NFC tag or taking their phone near a Bluetooth beacon at the facility. Furthermore, if the squadron members move too far away from the location or it has been too long since they checked in, they will be "checked out" (which is just moved back to accepted) and be required to check in at the location again before the deal can be redeemed.

As shown in FIG. 1, a geo-fence is disposed relative to the offeror's business which could be a bar, restaurant, movie theatre, etc., but the "geo-fence" is created around the mobile user. As used herein, "geo-fence" does not imply that an action in the squadron application is triggered when crossing the proximity boundary. Instead, in one embodiment of the invention, a user's location is checked based on explicit actions of the user (e.g., opening the app, attempting to check in). In this embodiment, explicit actions made by the user result in the location being updated. Then and thereafter, the results of future actions are based on the most recently updated location values.

In one embodiment which find deals within a certain distance of the mobile user and to be able to sort by radius, two longitudes and latitudes are calculated that are around the user's position to form a sort of box or fence. Then, the businesses which fall into that area of have their distances calculated using for example the Vincenty formula and their deals are eligible to be shown. The size of the geo-fence will be dynamically set by the SQUADRON backend services and it will use technologies such as GPS, Bluetooth Proximity, WiFi proximity, Cell Tower ID & SNR, Smartphone location services, etc. to verify the location of the SQUADRON users.

Figure 2:
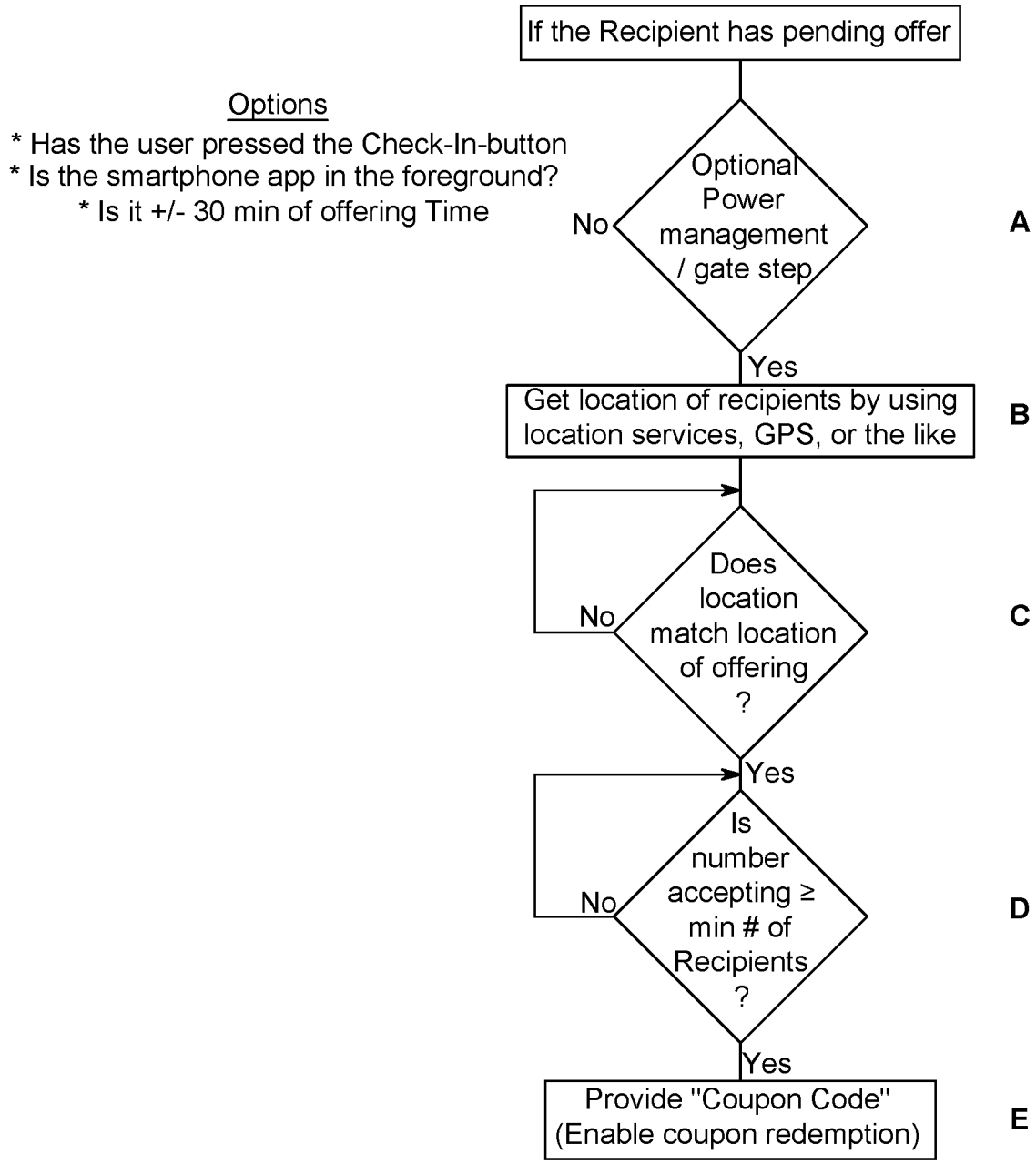
FIG. 2 is a flowchart depicting the operation of a squadron program according to the invention.

In the flow chart of FIG. 2, an algorithm of the SQUADRON invention is detailed. The basic algorithm may include the following procedures:

1. A squadron member selects a deal and then invites a number of other potential members between the minimum and maximum allowed by the deal.
2. The squadron members may receive a notification that they have been invited to a squad (not guaranteed since they can have notifications disabled). If the squadron members do not receive a notification, the squadron members can ask to be invited to a squad the next time the app is opened.
3. Their squadron invite status is pending until the squadron members accept or reject the invite. If rejected, the whole squad is rejected. In one embodiment, every invitee (so not the leader) must accept the deal before the squadron process moves to the accepted state. In one embodiment, every invitee must also check in at the location as described above before the squad deal can be redeemed.
4. In one embodiment, the squadron deal can only be redeemed when within the deals redemption time, every squad member has accepted and checked in, and the squad leader is at the location and pressed redeem. In one embodiment, a minimum number must be "invited" to activate the deal and move it into pending mode. However, a minimum number must be "present" at the business facility to redeem the deal. For example, if a deal that requires 4-8 squad members, and a squad of 6 people is formed. All 6 people must be there (even though the deal minimum is 4) before the deal can be redeemed. Also, in one embodiment of the invention, squadron members are never checked in passively, the squadron members must explicitly check in by pressing a button.

This algorithm shown in FIG. 2 is executable by way of one or more programs installed in the squadron coordinating server or installed in the user mobile or receiving devices, for example depicted in FIG. 1 and in communication between each other for example by internet.

As illustrated in FIG. 2, at step A—a optional power management/gate step is employed.

At step B—obtain the location of recipients by using location services, GPS, or the squadron users' mobile devices.

At step C—does the location match location of offering? Basically, is the recipient within the geo-fence established by the CS around the offeror's business?

At step D—Is the number of invited contacts accepting the squadron promotion equal to or greater than a minimum number of recipients? Basically, are enough members of the squadron physically present inside of the geo-fence and checked-in"?

At step E—provide "coupon ode" or otherwise enable deal redemption.

Figure 3:
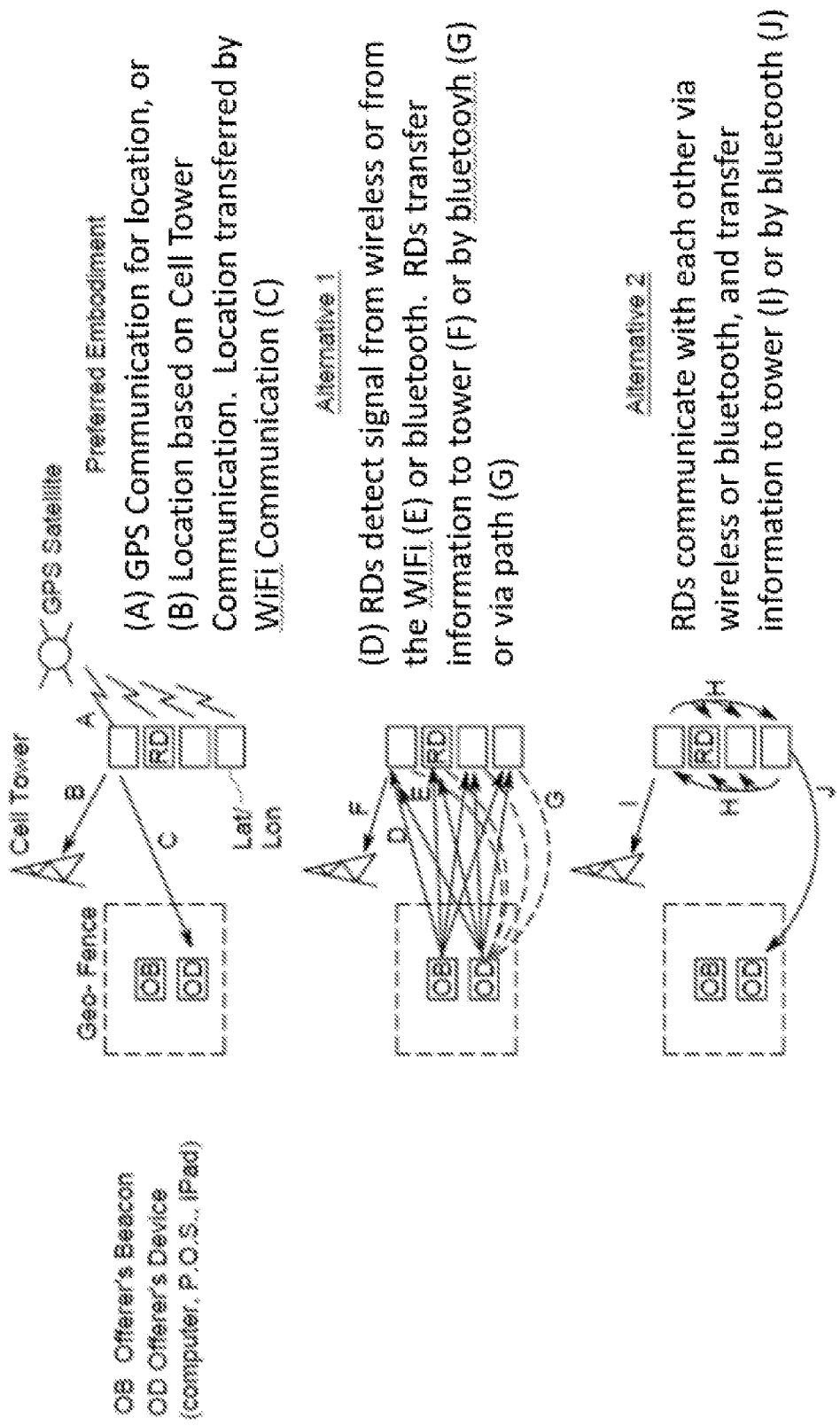
FIG. 3 is a schematic depicting different proximity determinations utilized in the squadron program according to the invention.

In the process schematic of FIG. 3, details of alternative ways to detect proximity of a squadron user to the offeror's place of business are shown. In a preferred embodiment, at A, GPS latitude/longitude determines the location of the mobile or receiving user devices and if these devices are in close proximity to the business offering the promotion. The latitude/longitude is sent to the CS and computations are done there. Related computations done by the mobile devices include showing the user the distance from the deal being displayed. At the coordinating server, the GPS latitude/longitude at C can be computed by using the latitude/longitude transferred via Communication Means (cell tower, OD WiFi/bluetooth) to the squadron coordinating server.

As an alternative, the user RDs detect a signal from a low range wireless device such as bluetooth beacon or from (E) the WiFi or bluetooth used by the offeror's device. The RDs transfer the information to the (F) cell tower or via the WiFi or bluetooth (G) of the OD.

As an alternative, WiFi, bluetooth or IR optical link of OD can be used via path (G) to directly detect the presence of RDs.

As an alternative, the RDs communicate with each other via (H) low range wireless devices such as bluetooth, WiFi, IR optical data links, etc. The RD then transfers the information to the cell tower (I) or to the OD via WiFi or bluetooth (J).

Figure 4:
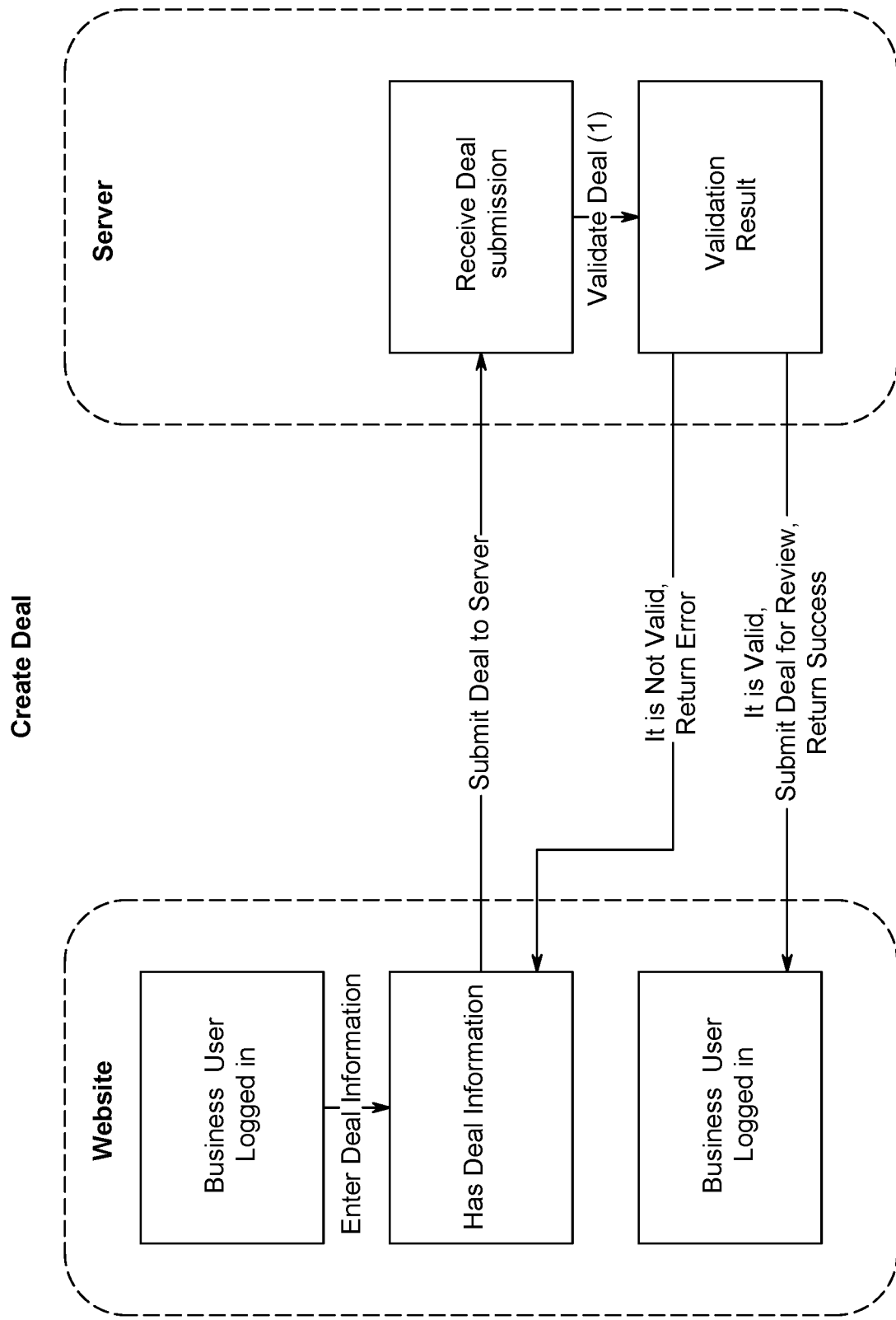
FIG. 4 is a schematic flowchart depicting a create deal schematic algorithm.

FIG. 4 is a schematic flowchart depicting a create deal schematic algorithm. In one embodiment, the deal creation process starts with business partner logging in to their portal on squadron website and entering deal information such as title, squad size, featured image, etc. Once all of that information is entered and submitted to the coordinating server, upon validation, the deal will get queued for review and the business partner will see a status of pending on their deal. Upon approval or rejection, the status will get updated on that site. The decision tree shown in FIG. 4 is merely exemplary of how a deal is created.

Figure 5:
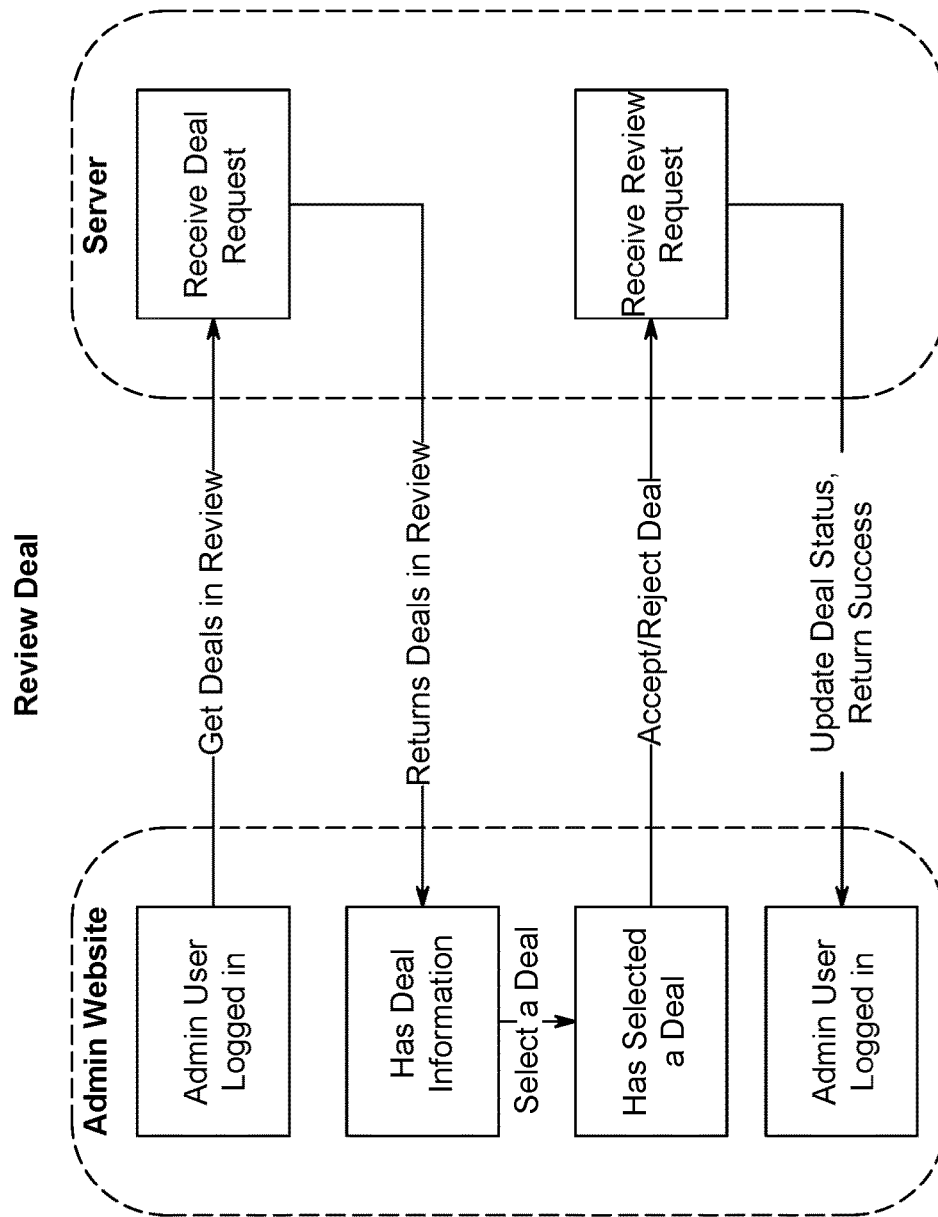
FIG. 5 is a schematic flowchart depicting a review deal schematic algorithm.

FIG. 5 is a schematic flowchart depicting a review deal schematic algorithm. In one embodiment, an administrative member of the squadron team will login to the admin website. There the administrative member will see all pending deals from the business partners and will have the opportunity to approve or reject deals. Should the administrative member decide to reject a deal, he/she may choose to provide a reason which will be shown to the business partner who created the deal. The decision tree shown in FIG. 5 is merely exemplary of how a deal is reviewed.

Figure 6:
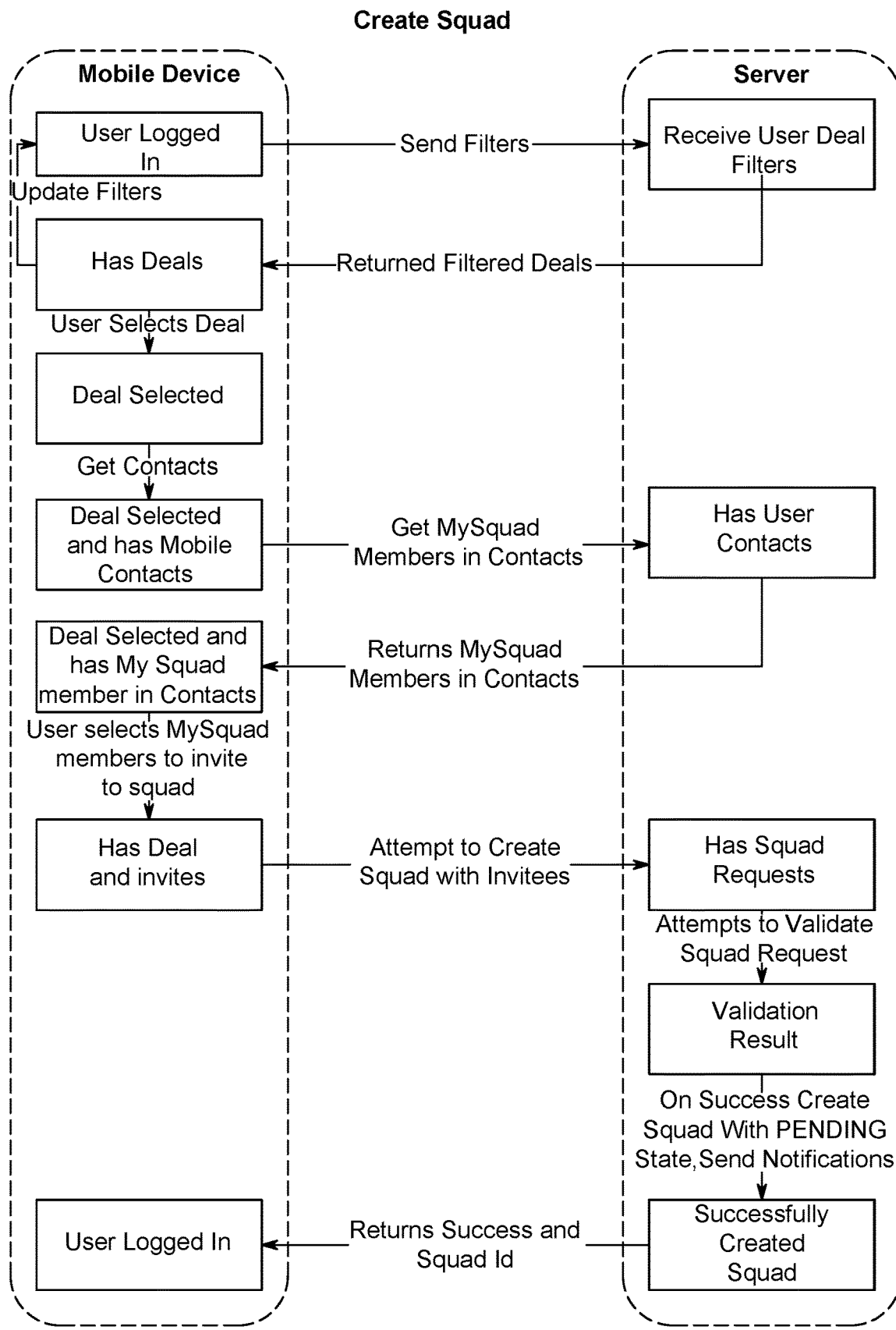
FIG. 6 is a schematic flowchart depicting a create squad schematic algorithm.

FIG. 6 is a schematic flowchart depicting a create squad schematic algorithm. In one embodiment, when a squadron user logs in on their mobile device, the application will send the mobile device filters to the coordinating server and obtain the corresponding deals for the mobile device of the user. If that user decides to move forward with one deal, the user will select the deal, press for example Squad Up button and upload their contacts to the coordinating server. The coordinating server then responds with those contacts who have already joined the squadron application (and thus can be a part of the squadron at that time). Once the user selects the minimum number of other/secondary mobile squadron users from their contacts, that list will get sent to the coordinating server and the coordinating server will validate the data and attempt to create a new squadron. Upon success, a push notification will get sent to every secondary invitee to let those members know that they are now a part of this squadron. The decision tree shown in FIG. 6 is merely exemplary of how a squad is created.

Figure 7:
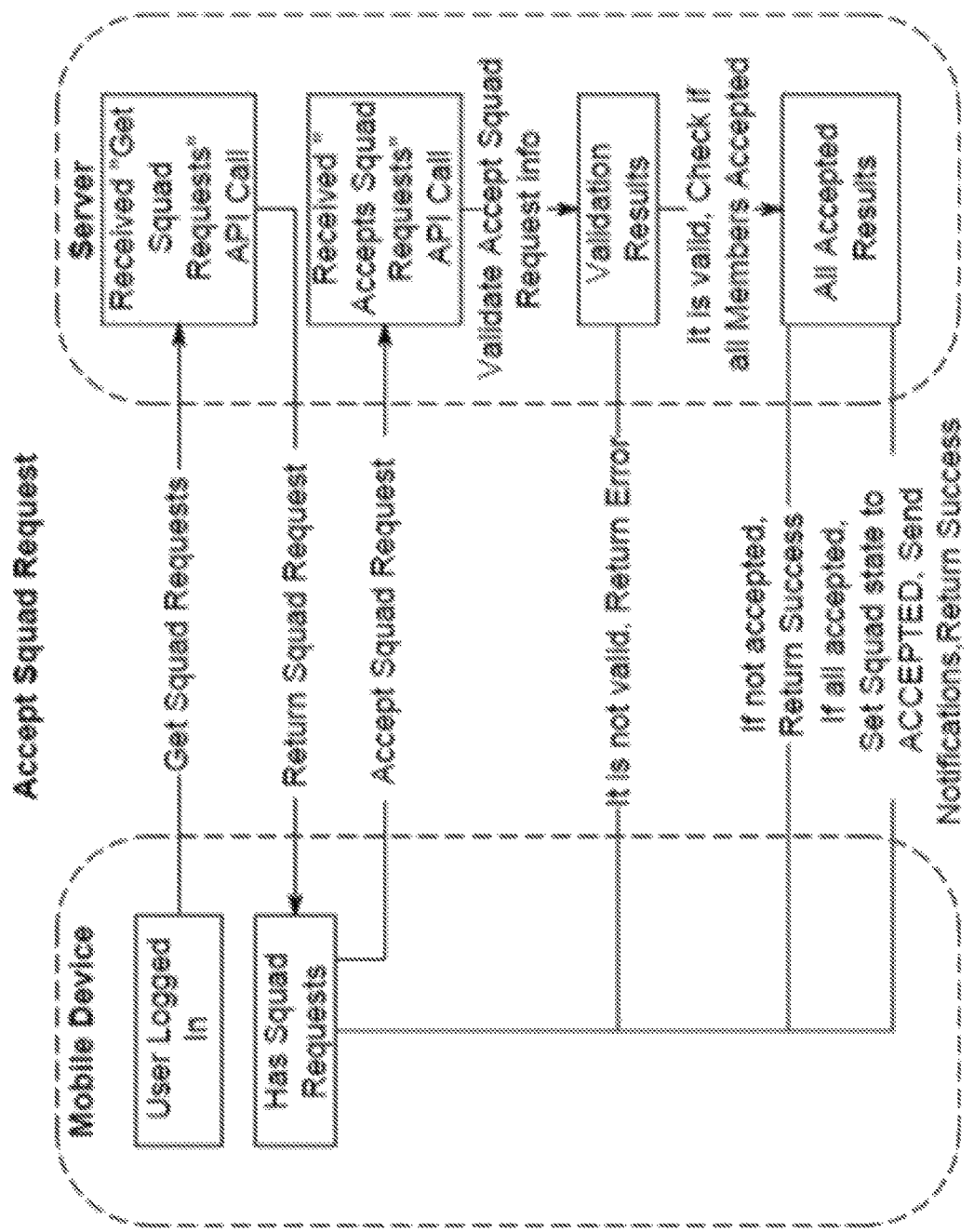
FIG. 7 is a schematic flowchart depicting an accept squad request schematic algorithm.

FIG. 7 is a schematic flowchart depicting an accept squad request schematic algorithm. In one embodiment, in order to accept a squad request, a squadron user must be logged in and request a list of their pending invites from the coordinating server. Upon receiving that list and accepting each of the invites, the user will notify the coordinating server of this decision and after validation on the server they will get a confirmation on their action. If that acceptance was the last one in a squadron (i.e. if all other users have already accepted) then the coordinating server will set the squad state to accepted and send a push notification to all users to let them know about this acceptance. The decision tree shown in FIG. 7 is merely exemplary of how a squad invitation is accepted.

Figure 8:
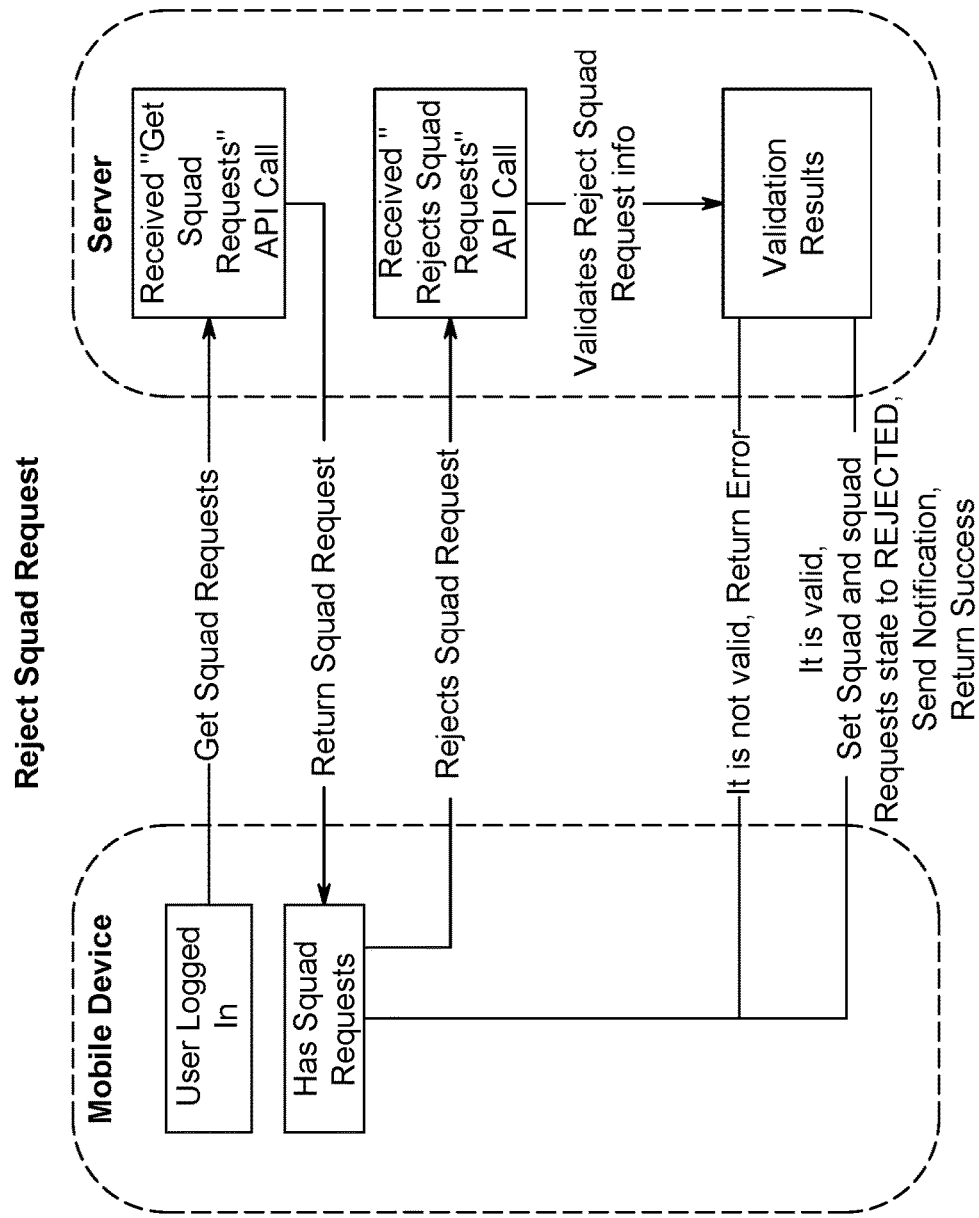
FIG. 8 is a schematic flowchart depicting a reject squad schematic algorithm.

FIG. 8 is a schematic flowchart depicting a reject squad schematic algorithm. In one embodiment, in order to reject a squad request, a logged in user will first get a list of their pending invites from the coordinating server. Upon rejecting one of those invites, the user will notify the coordinating server of this action and the coordinating server will validate their response. If the response is valid, the entire Squad state is set to rejected and a notification is sent to all members to let them know about this rejection. The decision tree shown in FIG. 8 is merely exemplary of how a squad invitation is rejected.

Figure 9:
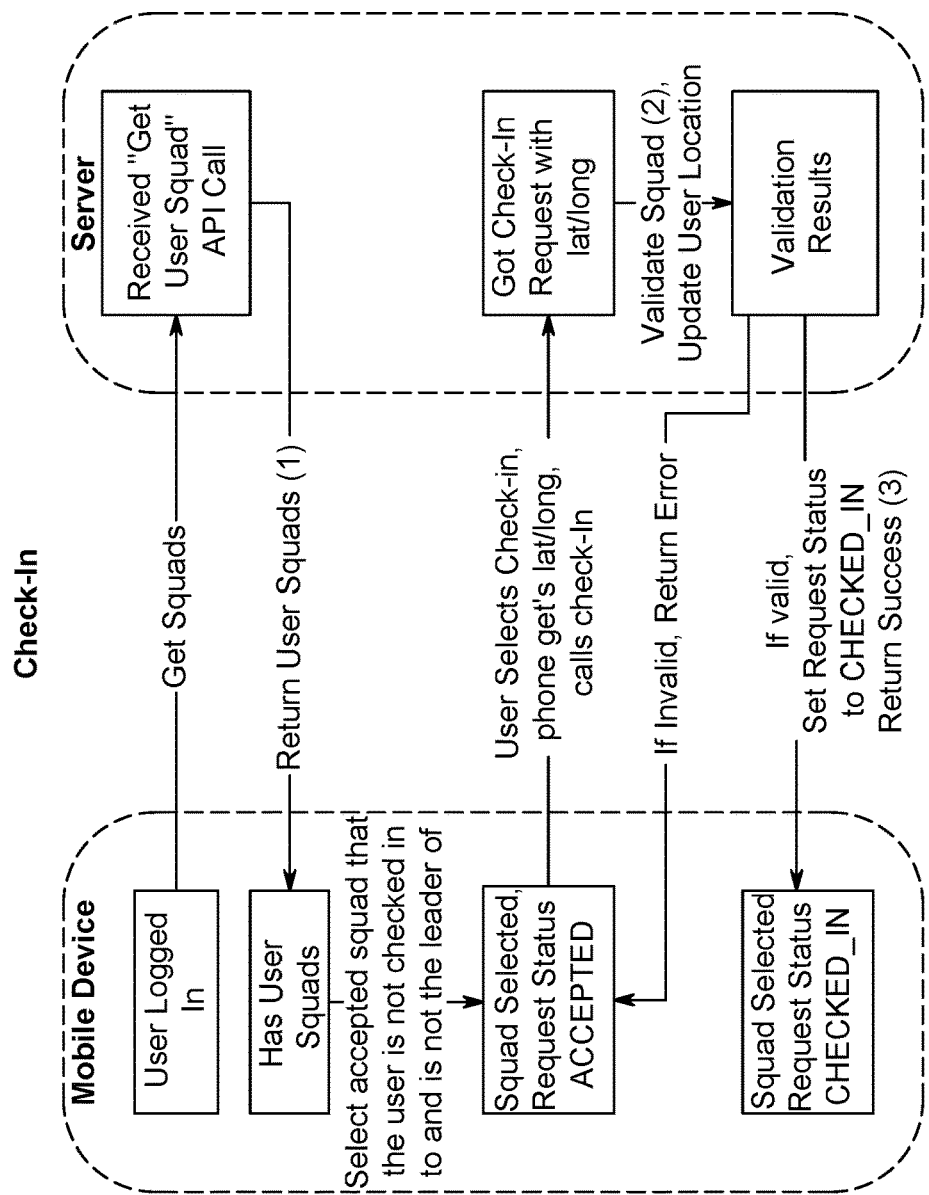
FIG. 9 is a schematic flowchart depicting a check in schematic algorithm.
Figure 10:
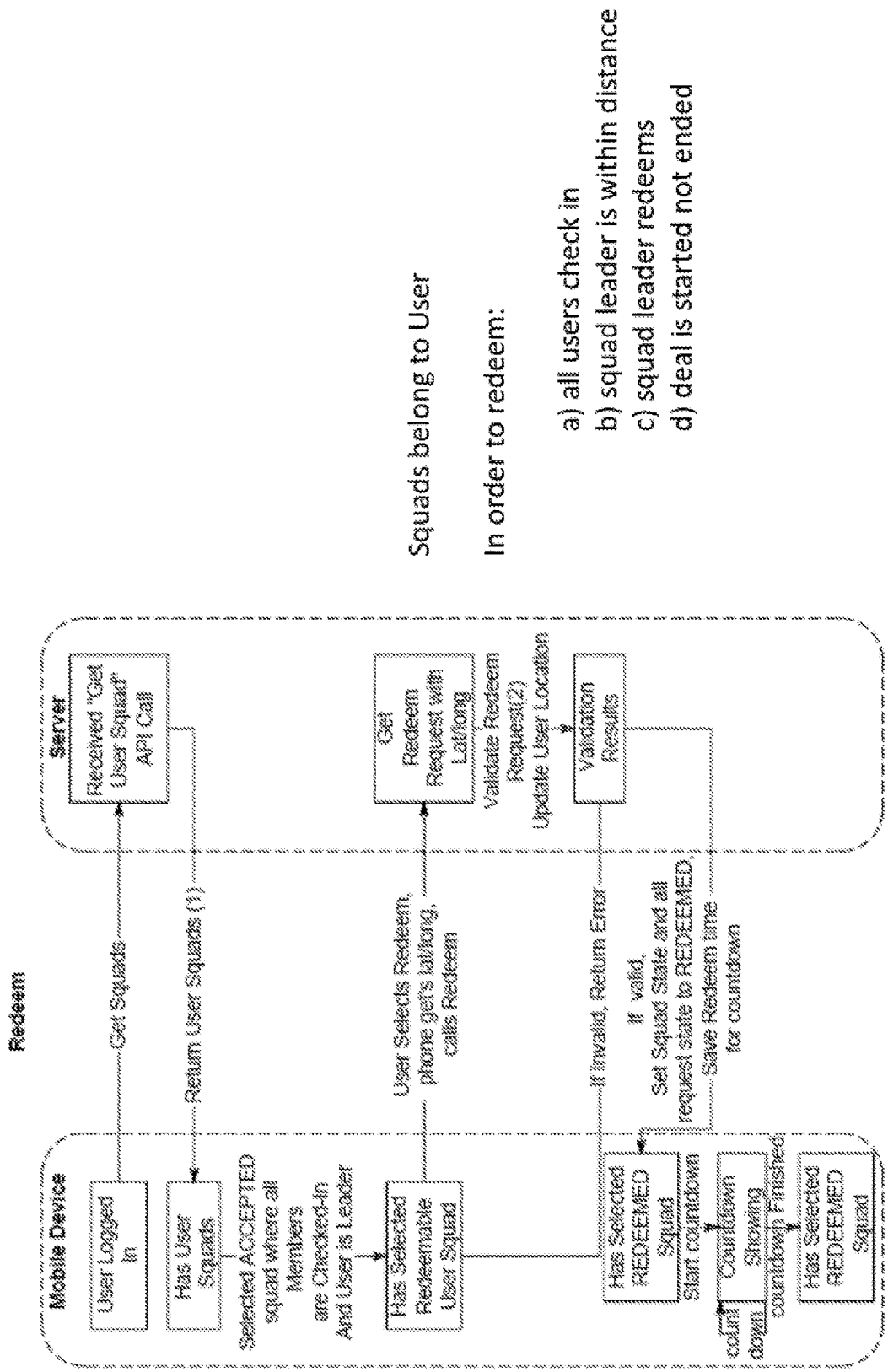
FIG. 10 is a schematic flowchart depicting a redeem schematic algorithm.

FIG. 9 is a schematic flowchart depicting a check in schematic algorithm. In one embodiment, when a squadron user wants to check in, that member of the squadron must first be logged in and then must ask for a list of the squads, in which the user is a member of and the state of which is set to accepted. Upon selecting one of those squads and tapping "check-in," the user's phone will get their location and provide the coordinating server with the coordinates of the user (and optionally a time stamp). Once that information is validated, that user's state is set to checked-in. The decision tree shown in FIG. 9 is merely exemplary of how a squad is checked in FIG. 10 is a schematic flowchart depicting a redeem schematic algorithm. In one embodiment, in order to redeem a deal, the primary mobile user must be logged in to the squadron app. The primary mobile user must first request a list of their Squads from the coordinating server and then select one squad in which all members/invitees have accepted and checked-in to the business location. Once the primary mobile user taps redeem, their phone will get their exact latitude and longitude and update the CS with that information along with the rest of the redeem request. Once the coordinating server has validated all the info, it will set the Squad state to redeemed and save the redeem time for countdown. The decision tree shown in FIG. 10 is merely exemplary of how a squad invitation is redeemed.

Thus, the invention in one embodiment related to load-load leveling provides a method/system/process to load-level buyer demand for example at non-peak hours by facilitating real-time couponing/incentive offers to a target group of likely acceptance, self-reinforcing buyers, the steps (or process) executed in this method or by this system include:

a) Offeror enters info into the offeror's device describing an incentive/discount offering where the description includes minimum number of recipients required to make an offer bona fide, time of offering, place of offering, type of incentive discount, or other pertinent information or announcements.

b) The communications server(s) routes an offer to identified recipients where routing can be based on and sorted by recipient's noted preferences.

c) The recipient using the recipient's device reviews the offering, optionally from a multiplicity of offers.

d) The recipient using an input device/means of the recipient device can accept the offering or reject the offering, and where the communications server(s) alert others, who are in the recipient's contact list, (i.e. Squadron members) of recipients' acceptance (and optionally recipient's preferred time to meet to redeem the offer), and the alerted Squadron members optionally accepts the Offer, whereby the communications server(s) communicate that information amongst the Squadron members in order to gain consensus of acceptance.

e) At the time of offering, a determination is made of sufficient proximity of recipient to the offeror's business location, the point of sale/point of purchase (POS) and the communications server(s) or offeror's device collect proximity information from the recipient's device (or the recipient's devices may communicate with one another) and calculate their distance to offeror's device or POS.

f) If proximity information indicates that the minimum number of recipients required to make an offer bona fide are in proximity to offeror's POS, then the communications server(s) enable the redemption of the offer by the recipient (s).

g) A recipient redeems the offer by using personal computing device or communications server(s) to provide at least one of code, redemption instruction, bar code, RF communication to offeror, offerors device, or offeror's POS terminal and recipient receives incentive/discount of offering.

Computer-Implementation

In various embodiments of the invention, there is provided various computer implemented systems, receiving devices, and servers for implementing the squadron application, and carrying out the squadron communications described above. Such computer system can include a central processing unit (CPU) or processor having a storage medium on which specifically programmed code is stored in executable form so the above-noted functions of the squadron application can be executed.

Figure 11:
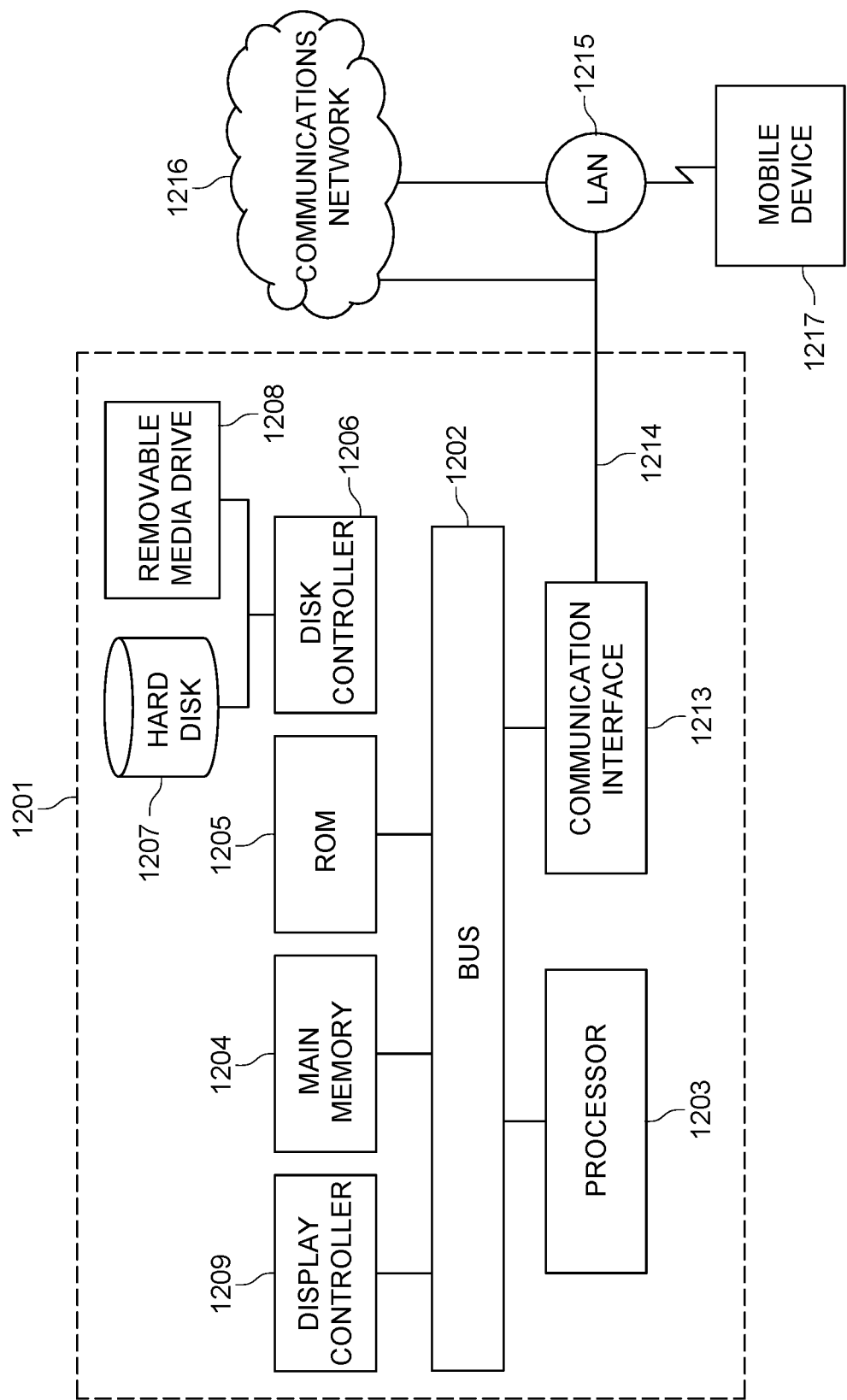
FIG. 11 is a schematic depicting a special purpose computing device according to the invention.

FIG. 11 illustrates a computer system 1201 for implementing various embodiments of the invention. The computer system 1201 may be used to perform any or all of the functions described above for the squadron application operating in the user mobile or receiving devices, the SQUADRON coordinating server, or the backend squadron computations. In particular embodiments, the computer system 1201 permits any one or more of the following implementations to be programed at the user mobile or receiving devices, the squadron coordinating server, or the backend squadron server:

1) Create a business-side website that allows businesses to register and publish deals/promotions/announcements that are stored in a database.
2) Create an administrative-side website (via a backend server) that allows coordinators to approve or reject deals/promotions/announcements that are being published by businesses.
3) Create iOS and Android applications that communicate with the backend server via Application Programming Interface (API) and has features of a typical social media application (login, profile, menus, etc.).
4) Use native Operating System methods for each platform to get access to user location using GPS.
5) Use native OS methods to get access to users contact list.
6) Retrieve and show a list of deals from the backend server.
7) Send the user's contact list to the backend server and receive a sub-list of those who are squadron users.
8) Allow a user to assemble a squadron from their contacts for a chosen deal and send squadron info to the backend server 9) Notify the user about the status of their squadron based on real-time info using push notifications.
10) When a squadron member presses check-in (or when they open the app after all members have accepted the deal) retrieve a user's geographical location and send to the backend server to receive permission to let the user to "check-in" to the business facility. Any member may check-in ahead of other members.
    a. As an alternative to this proximity detection, utilize a Bluetooth device (beacons) located in the business facility,
    b. utilize QR/Bar Codes or some other visual means printed or displayed at a facility,
    c. Use Near Field Communication (NFC) tags to detect the entrance of the user to a facility.
11—When the minimum number of recipients accept offer, designate offer as in "pending" state which means it is ready to be redeemed (note that the squadron is in the pending state when created and all invited users must accept before it is moved to the accepted state, or before it can be redeemed if all users have checked in),
12—Retrieve time duration to show deal in redeeming state and allow user to redeem by pressing the redeem button.
13—From a back-end perspective, utilize an IaaS service which provides computing infrastructure, physical or (quite often) virtual machines and other resources like virtual-machine disk image library, block and file-based storage, firewalls, load balancers, IP addresses, virtual local area networks etc from providers such as Amazon Web Services (AWS) to accomplish the following:
    1. Setup a server/serverless structure to handle incoming application programing interface (API) requests,
    2. Setup a database to store user, business, deal information, etc.,
    3. Setup mechanisms to send text, email, push notifications to users,
    4. Using pseudo code and the Vincenty formula below, approximate the distance from latitude 1,longitude 1 (user) to latitude 2,longitude2 (point of purchase) for verifying user proximity to point of purchase:

```
69 * degrees(
   atan2(
      sqrt(
         pow(cos(radians(lat2))*sin(radians(lon2-lon1)),2) +
         pow(cos(radians(lat1))*sin(radians(lat2)) -
            (sin(radians(lat1))*cos(radians(lat2)) *
            cos(radians(lon2-lon1))) ,2)),
      sin(radians(lat1))*sin(radians(lat2)) +
      cos(radians(lat1))*cos(radians(lat2))*cos(radians(lon2-lon1))))
```

5. Attain user location over time (e.g. if the user checked in an hour ago to the point of purchase, they must re-check-in before redeeming becomes available) and the deal redemption must take place within the duration of the deal
    6. Respond to the API calls for deal redemption and maintain actuarial data regarding how many deals were redeemed and by who and when To accomplish these and other implementations of the invention, components of computer system 1201 when utilized in one or more of the user mobile or receiving devices, the squadron coordinating server, or the backend squadron server may (as needed) include a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable read only memory (PROM), erasable PROM (EPROM), and electrically erasable PROM (EEPROM)) coupled to the bus 1202 for storing static information and instructions for the processor 1203.

The computer system 1201 may also include a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display, such as a cathode ray tube (CRT), for displaying information to a computer user. The computer system includes input devices, such as a keyboard and a pointing device, for interacting with a computer user and providing information to the processor 1203. The pointing device, for example, may be a mouse, a trackball, or a pointing stick for communicating direction information and command selections to the processor 1203 and for controlling cursor movement on the display.

The computer system 1201 can perform a portion or all of the processing steps (or functions) of this invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 may include at least one computer readable medium or memory for holding instructions programmed according to the teachings of the invention and for containing data structures, tables, records, or other data described herein for the execution of the operations noted above. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the invention includes software for controlling the computer system 1201, for driving a device or devices for implementing the invention, and for enabling the computer system 1201 to interact with a human user. Such software may include, but is not limited to, device drivers, operating systems, development tools, and applications software. Such computer readable media further includes the computer program product of the invention for performing all or a portion (if processing is distributed) of the processing performed in implementing the invention.

The computer code devices of the invention may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 which may be coupled to the bus 1202. The communication interface 1213 can provide a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices (e,g, to other user mobile receiving devices). For example, the network link 1214 may provide a connection to another computer through equipment operated by a service provider, which provides communication services through a communications network 1216. The local network 1214 and the communications network 1216 (between for example back-end servers or between coordinating servers) may use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

Numerous modifications and variations of the invention are possible in light of the above teachings. It is therefore to be understood that within the scope of the appended claims, the invention may be practiced otherwise than as specifically described herein.

The invention claimed is:

1. A system to provide directed communication exchange between mobile receiving devices of a squadron including a squadron leader and one or more squadron members, the system comprising:
  a coordinating server in communication with the mobile receiving devices;
  a squadron-member configurable network of the mobile receiving devices comprising a) a first mobile receiving device comprising a master mobile device in communication with the coordinating server and b) at least one second mobile receiving device in communication with the coordinating server, wherein selectable information from the coordinating server is in a user-selectable format, whereby a user-selection on the master mobile device identifies which ones of the mobile receiving devices are to be in communication with the coordinating server as part of the squadron network and the user-selection identifies selected information of the selectable information from the coordinating server to send to the mobile receiving devices;
  said coordinating server programmed to:
  receive a first data stream including a broadcast message,
  transmit over the squadron-member configurable network a second data stream including a list of announcements to the first mobile receiving device belonging to the squadron leader, when the squadron leader is within a pre-determined distance of one of multiple enterprises providing the announcements, wherein
  the announcements comprise the selected information comprising at least one offer from the one of the multiple enterprises geographically local to one of the mobile receiving devices to entice recipients of the announcements as a group to come to a first enterprise, the announcements comprising prescribed time periods of low-level activity at the first enterprise and a prescribed number of the recipients needed to redeem the offer, wherein redemption of the offer at the first enterprise increases activity at the first enterprise during one of the prescribed time periods of low-level activity, and
  receipt by the one of the mobile receiving devices of a localized wireless transmission signal broadcast directly from the first enterprise indicates that a recipient thereof is geographically local to the first enterprise,
  receive a third data stream from the first mobile receiving device including a selected announcement which was selected by the squadron leader on a display of the first mobile receiving device,
  transmit in a fourth data stream the selected announcement to the at least one second mobile receiving device of a potential member for the squadron;
  receive a fifth data stream from the at least one second mobile receiving device indicative of the potential member comprising a squadron member,
  collect proximity data including at least one of GPS, WiFi, BLUETOOTH, cell tower information, or smart phone location services from the first mobile receiving device and the at least one second mobile receiving device and determine at the coordinating server by way of the collected proximity data that the squadron leader and the one or more squadron members are within a boundary of the first enterprise associated with the selected announcement, and
  transmit in a sixth data stream a verification that the squadron is at the first enterprise;
  wherein
  acceptance of the offer by one or more of the squadron members is communicated to the squadron as a part of the directed communication exchange between the mobile receiving devices,
  each of the mobile receiving devices of the squadron members in the squadron-member configurable network receive, as said part of the directed communication exchange between the mobile receiving devices, confirmation of formation of the squadron, and
  verification in the sixth data stream that the squadron is at the first enterprise and the redemption of the offer load level activity by the squadron at the first enterprise at said one of the prescribed time periods of the low-level activity.

2. The system of claim 1, wherein, in the first data stream, one or more remote servers provide in the broadcast message at least one of alerts, alarms, promotions, news items, weather items, promotional discounts, and location and contact information for enterprises associated with the list of announcements.

3. The system of claim 1, wherein
the coordinating server is programed to calculate respective distances that the squadron leader is from the enterprises and to verify that the squadron is at the enterprise in a required number, and
the announcements provided from the multiple enterprises is sorted by distance of a recipient from the enterprises.

4. The system of claim 3, wherein
the coordinating server transmits in the second data stream announcements sorted by a preference of the squadron leader.

5. The system of claim 1, wherein the coordinating server is programmed to notify the enterprise that the squadron is at the enterprise in the required number at a predesignated time.

6. The system of claim 1, wherein the coordinating server is programmed to start a timer such that the squadron including the squadron leader has a fixed to time to arrive at the enterprise.

7. The system of claim 1, wherein the coordinating server is programmed to provide the first mobile receiving device the list of announcements in the user-selectable format for display and selection on the first mobile receiving device.

8. The system of claim 1, wherein the coordinating server is programmed to send a push notification to the potential member of the squadron once the selected announcement has been received at the coordinating server, the push notification having a link for the potential member to activate and become one of the squadron members.

9. The system of claim 1, wherein the coordinating server is programmed to recognize a check-in of the squadron at the enterprise.

10. The system of claim 1, wherein the coordinating server is programmed to recognize the potential member, upon becoming a member of the squadron, to subsequently become a squadron leader of a different squadron.

11. A method for communication exchange in a squadron-member configurable network of mobile receiving devices of a squadron including a squadron leader and one or more squadron members, the squadron-member configurable network comprising a) a first mobile receiving device comprising a master mobile device in communication with a coordinating server and b) at least one second mobile receiving device in communication with the coordinating server, wherein selectable information from the coordinating server is in a user-selectable format, whereby a user-selection on the master mobile device identifies selected information of the selectable information and which ones of the mobile receiving devices are to be in communication with the coordinating server as part of the squadron network and receive the selected information,
the method comprising:
receiving a first data stream including a broadcast message,
transmitting a second data stream over the squadron-member configurable network including a list of announcements to the first mobile receiving device belonging to a squadron leader, wherein
the announcements comprise the selected information comprising at least one offer from multiple enterprises geographically local to one of the mobile receiving devices to entice recipients of the announcements as a group to come to a first enterprise, the announcements comprising prescribed time periods of low-level activity and a prescribed number of the recipients needed to redeem the offer, and wherein redemption of the offer increases activity at the first enterprise during one of the prescribed time periods of low-level activity, and
receipt by the one of the mobile receiving devices of a localized wireless transmission signal broadcast directly from the first enterprise indicates that a recipient thereof is geographically local to the first enterprise,
receiving a third data stream from the first mobile receiving device including a selected announcement which was selected by the squadron leader on a display of the first mobile receiving device,
transmitting in a fourth data stream the selected announcement to the at least one second mobile receiving device of a potential member for the squadron;
receiving a fifth data stream from the at least one second mobile receiving device indicative of the potential member comprising a squadron member,
collecting proximity data including at least one of GPS, WiFi, BLUETOOTH, cell tower information, or smart phone location services from the first mobile receiving device and the at least one second mobile receiving device and determining at the coordinating server by way of the collected proximity data that the squadron leader and the one or more squadron members are within a boundary of the first enterprise associated with the selected announcement,
transmitting in a sixth data stream a verification that the squadron is at the first enterprise;
wherein
acceptance of the offer by one or more of the squadron members is communicated to the squadron as a part of the directed communication exchange between the mobile receiving devices,
each of the mobile receiving devices of the squadron members in the squadron-member configurable network receive, as said part of the communication exchange between the mobile receiving devices, confirmation of formation of the squadron, and
the verification in the sixth data stream that the squadron is at the first enterprise and the redemption of the offer by the squadron load level activity at the first enterprise at said one of the prescribed time periods of the low-level activity.

12. The method of claim 11, wherein, in the first data stream, one or more remote servers provide in the broadcast message at least one of alerts, alarms, promotions, news items, weather items, promotional discounts, and location and contact information for enterprises associated with the list of announcements.

13. The method of claim 11, further comprising calculating respective distances that the squadron leader is from the enterprises and to verify that the squadron is at the enterprise in a required number, and
sorting the announcements provided from the multiple enterprises by distance of a recipient from the enterprises.

14. The method of claim 13, further comprising transmitting in the second data stream announcements sorted by a preference of the squadron leader.

15. The method of claim 11, further comprising notifying the enterprise that the squadron is at the enterprise in the required number at a predesignated time.

16. The method of claim 11, further comprising starting a timer such that the squadron including the squadron has a fixed to time to arrive at the enterprise.

17. The method of claim 11, further comprising providing the first mobile receiving device the list of announcements in a user-selectable format for display and selection on the first mobile receiving device.

18. The method of claim 11, further comprising sending a push notification to the potential member of the squadron once the selected announcement has been received at the coordinating server, the push notification having a link for the potential member to activate and become one of the squadron members.

19. The method of claim 11, further comprising recognizing a check-in of the squadron at the enterprise.

20. The method of claim 11, further comprising recognizing the potential member, upon becoming a member of the squadron, to subsequently become a squadron leader of a different squadron.

21. A computerized method for squadron communication exchange between mobile receiving devices of a squadron-member configurable network, the squadron-member configurable network comprising mobile receiving devices including a) a first mobile receiving device comprising a master mobile device in communication with a coordinating server and b) at least one second mobile device in communication with the coordinating server, wherein selectable information from the coordinating server is in a user-selectable format whereby a user-selection on the master mobile device identifies selected information of the selectable information and which ones of the mobile receiving devices are to be in communication with the coordinating server as part of the squadron network and receive the selected information, the method comprising:
receiving from an offeror offers to be broadcast between the receiving devices;
routing, by the coordinating server over the squadron-member configurable network to the mobile receiving devices of identified recipients, one or more of the offers by which the identified recipients view the offers and accept or reject the offers;
at the time of the routing, determining by the coordinating server that the at least one recipient is within a predetermined distance of a point of purchase of a selected offer selected by the at least one recipient, said at least one recipient comprising a squadron leader, wherein
the offers comprise the selected information from multiple enterprises geographically local to one of the receiving devices to entice recipients of the offers as a group to come to a first enterprise, the information comprises prescribed time periods of low-level activity at the first enterprise and a prescribed number of the recipients needed to redeem the offer, wherein redemption of said one or more of the offers increases activity at the first enterprise during one of the prescribed time periods of low-level activity, and
receipt by the one of the mobile receiving devices of a localized wireless transmission signal broadcast directly from the first enterprise indicates that a recipient thereof is geographically local to the first enterprise;
forming in the coordinating server a list of squadron members comprising a squadron accepting the selected offer;
collecting proximity data including at least one of GPS, WiFi, BLUETOOTH, cell tower information, or smart phone location services from the master mobile device and the at least one second mobile device, and at time of redemption of the selected offer, determining by the coordinating server by the collected proximity data that a minimum number of the squadron members and the squadron leader are in a predetermined proximity to the point of purchase; and
sending from the coordinating server a redemption transmission for the selected offer, wherein the redemption transmission includes one or more of a code, a redemption instruction, a bar code, and a radio frequency RF communication,
wherein
acceptance of the offer by one or more of the squadron members is communicated to the squadron as a part of the directed communication exchange between the mobile receiving devices,
each of the identified recipients in the squadron-member configurable network, as said part of the squadron communication exchange, receive confirmation of formation of the squadron, and
the determining that the minimum number of the squadron members and the squadron leader are in the predetermined proximity and the redemption of the selected offer by the squadron load level activity at the first enterprise at said one of the prescribed time periods of the low-level activity.

22. A system for efficient communication exchange to electronically verify consensus on a proximally and temporally constrained solution space, the system comprising:
a multiplicity of mobile devices forming a squadron-member configurable network and programmed with a communication exchange program to receive communication information from a coordinating server;
the squadron-member configurable network comprising mobile receiving devices including a) a first mobile device comprising a master mobile device in communication with the coordinating server and b) at least one second mobile device in communication with the coordinating server, wherein selectable information from the coordinating server is in a user-selectable format, whereby a user-selection on the master mobile device identifies selected information of the selectable information and which ones of the mobile receiving devices are to be in communication with the coordinating server as part of the squadron network and receive the selected information;
the master mobile device of the multiplicity of mobile devices, programmed to, display the selected information received from the coordinating server in a format for user selection on the master mobile device,
identify user selection of selected information from the communication information,
store the selected information, and
identify secondary recipients for sharing the selected information with;
at least one secondary mobile device of the multiplicity of mobile devices, associated with one of the secondary recipients, configured to receive a part or all of the selected information, wherein
the selected information comprising at least one offer is from multiple enterprises geographically local to one of the mobile devices to entice recipients of the selected information as a group to come to a first enterprise, the information comprises prescribed time periods of low-level activity at the first enterprise and a prescribed number of the recipients needed to redeem the offer, wherein redemption of the offer at the first enterprise increases activity at the first enterprise during one of the prescribed time periods of low-level activity, receipt by the one of the mobile devices of a localized wireless transmission signal broadcast directly from the first enterprise indicates that a recipient thereof is geographically local to the first enterprise, and collecting proximity data including at least one of GPS, WiFi, BLUETOOTH, cell tower information, or smart phone location services from the master mobile device and the at least one second mobile device, wherein consensus confirmation is accomplished when the coordinating server recognizes that a squadron comprising the master mobile device and a predetermined number of the secondarily invited mobile devices have responded positively to the selected information and by the proximity data are at the first enterprise, acceptance of the offer by the master mobile device is communicated to the secondarily invited mobile devices, each of the secondary recipients receive confirmation of the consensus confirmation, and the activity at the first enterprise is load leveled by the consensus confirmation and the redemption of the offer by the squadron at said one of the prescribed time periods of the low-level activity.

23. A computerized method for communication protocol pass reduction amongst nodes comprising different decisions points to determine a passing joint set of nodes for squadron communication therebetween, the set of nodes forming a squadron-member configurable network comprising a) a master node in communication with a coordinating server and b) at least one secondary node in communication with the coordinating server, wherein selectable information from the coordinating server is in a user-selectable format, whereby the master node identifies selected information of the selectable information and which ones of the nodes are to be in communication with the coordinating server as part of the squadron network and receive the selected information, the method comprising:

providing squadron communication over the squadron-member configurable network between different recipient nodes, wherein one of the recipient nodes becomes a squadron leader node upon a selection of a specific broadcast message for distribution to other recipient nodes for acceptance; and the squadron leader node and the other recipient nodes upon acceptance form the passing joint set of nodes for squadron communication therebetween, wherein the specific broadcast message comprises the selected information comprising an offer from multiple enterprises geographically local to at least one of the nodes to entice recipients of the information as a group to come to a first enterprise, the information comprises prescribed time periods of low-level activity at the first enterprise and a prescribed number of the recipients needed to redeem the offer, wherein redemption of the offer at the first enterprise increases activity at the first enterprise during one of the prescribed time periods of low-level activity, receipt at one of the nodes of a localized wireless transmission signal broadcast directly from the first enterprise indicates that a recipient thereof is geographically local to the first enterprise, and collecting proximity data including at least one of GPS, WiFi, BLUETOOTH, cell tower information, or smart phone location services from the master node and the at least one secondary node, wherein proximity data indicates at the coordinating server that the squadron leader node and the other recipient nodes have responded positively to the selected information, wherein acceptance of the offer at the squadron leader node is communicated amongst the other recipient nodes, each of the nodes in the squadron-member configurable network receive confirmation of formation of the squadron network, and the activity at the first enterprise is load leveled by the redemption of the offer at the first enterprise at said one of the prescribed time periods of the low-level activity.

* * * * *